(12) United States Patent
Swearingen et al.

(10) Patent No.: US 8,417,617 B1
(45) Date of Patent: Apr. 9, 2013

(54) METHOD AND SYSTEM FOR OBTAINING THE BEST FILL FOR AN ORDER USING AUTOMATED SUBORDERS

(75) Inventors: Bradley J. Swearingen, Round Rock, TX (US); David S. Harding, Austin, TX (US); Brant C. Lewis, Austin, TX (US); Richard Munoz, Jr., Cedar Park, TX (US); Gregory Scott Mogonye, Austin, TX (US)

(73) Assignee: Charles Schwab & Co., San Francisco, CA (US)

( * ) Notice: Subject to any disclaimer, the term of this patent is extended or adjusted under 35 U.S.C. 154(b) by 1772 days.

(21) Appl. No.: 10/126,347

(22) Filed: Apr. 18, 2002

Related U.S. Application Data

(60) Provisional application No. 60/286,855, filed on Apr. 27, 2001.

(51) Int. Cl.
*G06Q 40/00* (2012.01)
(52) U.S. Cl. ............................ 705/37; 705/36 R; 705/35
(58) Field of Classification Search .................... 705/34, 705/35–38
See application file for complete search history.

(56) References Cited

U.S. PATENT DOCUMENTS

| | | | |
|---|---|---|---|
| 5,864,827 A | 1/1999 | Wilson | |
| 6,014,643 A | 1/2000 | Minton | |
| 6,278,982 B1* | 8/2001 | Korhammer et al. | 705/36 R |
| 6,408,282 B1* | 6/2002 | Buist | 705/36 R |
| 6,907,404 B1 | 6/2005 | Li | |
| 7,020,632 B1* | 3/2006 | Kohls et al. | 705/37 |
| 7,409,366 B1 | 8/2008 | Amanat et al. | |
| 7,580,875 B1* | 8/2009 | Finn et al. | 705/35 |
| 2001/0042785 A1* | 11/2001 | Walker et al. | 235/379 |
| 2002/0007335 A1* | 1/2002 | Millard et al. | 705/37 |
| 2002/0052824 A1* | 5/2002 | Mahanti et al. | 705/37 |
| 2002/0156719 A1 | 10/2002 | Finebaum et al. | |
| 2002/0161687 A1 | 10/2002 | Serkin et al. | |
| 2003/0004850 A1 | 1/2003 | Li et al. | |
| 2004/0117302 A1* | 6/2004 | Weichert et al. | 705/40 |

OTHER PUBLICATIONS

My Job His customer negotiations result in obtaining The best product price, York Daily Record. York, Pa.: May 25, 2000. p. E.02.*
Office Action dated Apr. 11, 2007 from U.S. Appl. No. 10/126,346, 10 pages.
Office Action dated Jul. 20, 2007 from U.S. Appl. No. 10/126,346, 12 pages.

(Continued)

*Primary Examiner* — Hani M Kazimi
*Assistant Examiner* — Clement B Graham
(74) *Attorney, Agent, or Firm* — Kilpatrick Townsend & Stockton LLP

(57) ABSTRACT

A computerized system (10) and method for obtaining the best fill for an order using automated suborders is disclosed. The system (10) includes a client system (14) that proves a user interface (150) for inputting an order and a single click operation for initiating the order. The system (10) also includes a server system (12) that is in communication with the client system (14) and a plurality of trade execution locations (30). When the server system (12) receives the order from the client system (14), the server system (12) parses the order into a plurality of suborders. The server system (12) then sends each of the suborders to one of the market participants which are selected and sorted based upon having the best available price for a particular suborder. As such, if all of the suborders are filled, the best price is obtained for the order.

40 Claims, 13 Drawing Sheets

OTHER PUBLICATIONS

Office Action dated Dec. 13, 2007 from U.S. Appl. No. 10/126,346, 10 pages.
Office Action dated Jan. 29, 2009 from U.S. Appl. No. 10/126,346, 13 pages.
Office Action dated Aug. 18, 2009, from U.S. Appl. No. 10/126,346, 13 pages.
Office Action dated May 24, 2010 from U.S. Appl. No. 10/126,346, 14 pages.
Office Action dated Mar. 6, 2007 from U.S. Appl. No. 10/126,408, 30 pages.
Office Action dated Jun. 14, 2007 from U.S. Appl. No. 10/126,408, 31 pages.
Office Action dated Oct. 17, 2007 from U.S. Appl. No. 10/126,408, 14 pages.
Office Action dated Mar. 18, 2008 from U.S. Appl. No. 10/126,408, 13 pages.
Office Action dated Dec. 23, 2008 from U.S. Appl. No. 10/126,408, 10 pages.
Office Action dated Jun. 23, 2009 from U.S. Appl. No. 10/126,408, 13 pages.
Office Action dated Nov. 9, 2009 from U.S. Appl. No. 10/126,408, 14 pages.
Office Action dated Aug. 26, 2010 from U.S. Appl. No. 10/126,408, 16 pages.
CyberTrader 2.1, Traders Workstation, Apr. 2000.
Cyber X2, 2001.
"CyberTrader 1.7 Offers Greater Market Intelligence and Execution Control, Helping Traders Control Their Risk in Volatile Markets"; PR Newswire Dec. 9, 1998.
CyberTrader and CyberTrader's Workstation, Version 1.7, Oct. 1998.
Nasdaq Workstation II, Guide to Software Enhancements, v 1.87j, May 1999.
Nasdaq Workstation II, Guide to Software Enhancements, v 1.61, Apr. 1998.
Burmistrov, I.V.; "Developing a workstation for stocktraders, Human Interfaces in Control Rooms, Cockpits and Command Centres"; 1999, International Conference, pp. 298-301.
www.tradingtechnologies.com Dec. 7, 2000. http://web.archive.org/web/20001207025500/www.tradingtechnologies.com.
Kharour, Jim et al.; "A Trading room with a view"; 2008, Futures, vol. 27, No. 11, Retrived Nov. 13, 2008 from ABI/INFORM Global database. (Document ID: 35697774).
eSignal Chapter 7 http://web.archive.org/web/20000816230417/www.esignal.com/features/pdf/ch07.pdf., eSignal Chapter 13 http://web.archive.org/web/20000816230508/www.esignal.com/features/pdf/ch13.pdf., eSignal Chapter 1 http://web.archive.org/web/20000816230323/www.esignal.com/features/pdf/ch01.pdf.
Chapter 2 http://web.archive.org/web/20000816230333/www.esignal.com/feature/pdf/ch02.pdf., Chapter 3 http://web.archive.org/web/20000816230342/www.esignal.com/feature/pdf/ch03.pdf.,
Chapter 6 http://web.archive.org/web/20000816230409/www.esignal.com/feature/pdf/ch06.pdf.
Chapter 10 http://web.archive.org/web/20000816230445/www.esignal.com/feature/pdf/ch10.pdf., Chapter 11 http://web.archive.org/web/20000816230452/www.esignal.com/feature/pdf/ch11.pdf., Chapter 12 http://web.archive.org/web/20000816230459/www.esignal.com/feature/pdf/ch12.pdf.
Chapter 14 http://web.archive.org/web/2000816230514/www.esignal.com/feature/pdf/ch14.pdf., Chapter 16 http://web.archive.org/web/20000816230533/www.esignal.com/feature/pdf/ch16.pdf., Chapter 17 http://web.archive.org/web/20000816230544/www.esignal.com/feature/pdf/ch17.pdf.
Chapter 7 http://web.archive.org/web/20000816230417/www.esignal.com/feature/pdf/ch07.pdf., Chapter 13 http://web.archive.org/web/20000816230508/www.esignal.com/feature/pdf/ch13.pdf.

* cited by examiner

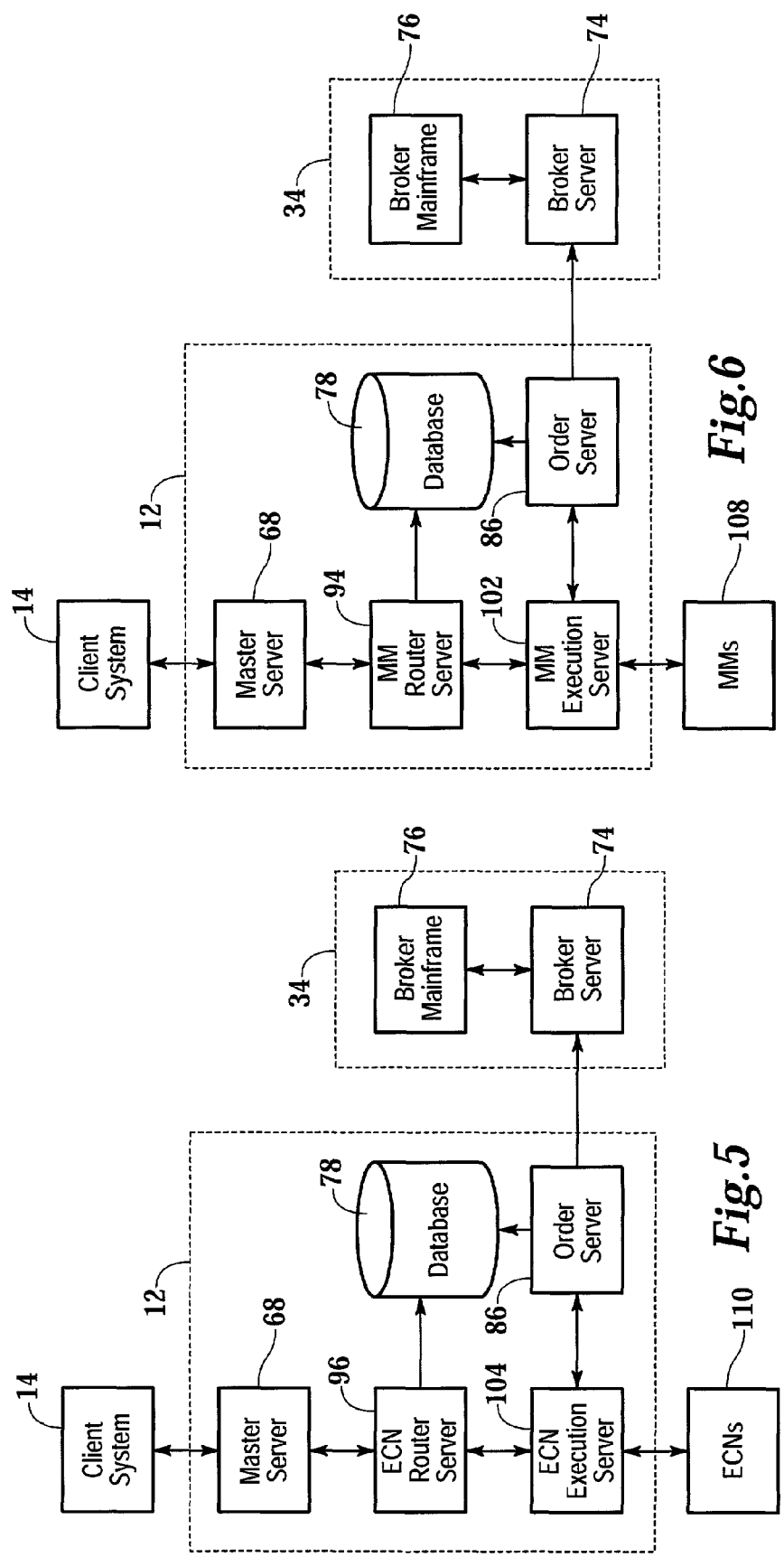

METHOD AND SYSTEM FOR OBTAINING THE BEST FILL FOR AN ORDER USING AUTOMATED SUBORDERS

PRIORITY UNDER 35 U.S.C. §119(3) AND 37 C.F.R. §1.78

The present nonprovisional patent application claims priority based upon pending U.S. Provisional patent application Ser. No. 60/286,855 which was filed Apr. 27, 2001.

TECHNICAL FIELD OF THE INVENTION

This invention relates in general to a computer method and system for providing security information to a user and allowing the user to execute security trades and, in particular, to a computer method and system for obtaining the best fill for an order using automated suborders.

BACKGROUND OF THE INVENTION

Without limiting the scope of the present invention, its background will be described with regard to trading common stock, as an example.

In trading common stock, there are three fundamental factors an investor must consider. These factors are what stock to trade, when to open a position in the stock and when to close that position in the stock. There are enumerable models that attempt to help the investor identify these factors each of which are based upon particular criteria. Some of the models are best suited for the long term investor using a buy and hold approach. Other models are better suited for the short term investor including, for example, an active investor who opens and closes positions in the same day or week.

In determining what stock to trade, a typical long term investor may perform substantial research into a particular company in an effort to evaluate the future success of that company. For example, a long term investor may evaluate whether the company has products or services that are likely to have an increase in sales, the effectiveness of a company's research and development, the profit margin of the company, the size and effectiveness of the company's sales organization, labor relations within the company, the quality of management personnel at the company, the competitiveness of the company in relation to other companies in the industry, the long range outlook for profits and the like.

In addition to these business related factors, the long term investor may look at factors such as whether the company typically pays dividends on common stock, the price to earnings ratio of the stock and the market capitalization of the company as well as earnings, revenue and net income of the company. On the other hand, an investor that is interested in short term investments may not perform such detailed research but instead may focus on factors such as volume of trades, proximity to a milestone such as a fifty two week high, difference between current volume and a historical volume, number of daily highs, money flow and the like in identifying a stock of interest.

Once an investor has identified a stock of interest, the investor must then determine when and how to open a position in that stock. A long term investor might, for example, call a broker and request the purchase of a certain number of shares of the stock at the market price. The short term investor, however, who may be more interested in such factors as the volatility of the stock or the liquidity of the stock in making such a decision may want to use an online system to place an order to achieve faster execution.

The next step for an investor once they have opened a position in a stock is to determine when to close that position. A long term investor may, for example, make a decision to sell a stock based upon factors such as a fundamental change in a company that does not comport with the investor's original criteria for buying stock in that company, a change in management in the company, under performance of the stock, the stock reaching an unacceptable low, a belief that the stock has peaked or simply a belief that another investment has better long term prospects. Again, the long term investor may call a broker and request that the stock be sold at a particular time or when it reaches a particular price. While some of the above factors may also be important to a short term investor, a short term investor may focus more heavily on such factors as the continued momentum of the stock or simply making certain all open positions are closed by the end of a day and may again use an online system to achieve trade execution.

Regardless of the investment strategies, however, these three factors, what to stock to trade, when and how to open a position in that stock and when and how to close the position in that stock, remain key elements in any successful investment strategy. Therefore, a need has arisen for a system and method that provide the investor with a user environment that includes information that is useful in selecting stocks and that allow the investor to execute trades. A need has also arisen for such a method and system that provide the investor with access to multiple trade execution locations include multiple market participant types. Further, a need has arisen for such a method and system wherein the investor may obtain the best fill for an order.

SUMMARY OF THE INVENTION

The present invention disclosed herein comprises a computer based system and method for obtaining the best fill for an order using automated suborders. The system and method of the present invention provide the investor with a user environment that includes information about stocks and that allows the investor to execute trades. The system and method of the present invention also provide the investor with access to multiple trade execution locations include multiple market participant types. In addition, the system and method of the present invention allow the investor to obtain the best fill for an order.

The computer based system and method of the present invention utilize a computer program embodied on a computer readable medium on a client system and a computer program embodied on a computer readable medium on a server system. The client system and the server system are in communication with one another using known communication means. The server system is also in communication with a plurality of security data sources and a plurality of trade execution locations.

In operation, the server system accepts an order for the execution of the trade from the client system. The server system then determines the availability and price of the security at the various of market participants. The server system then sorts the plurality of market participants and parses the order into a plurality of suborders such that each of the suborders is sent to one of the market participants. In addition, the server system may set a suborder timer for filling each of the suborders and an order timer of filling all of the suborders. The server system will then cancel respective suborders when the suborder timers expire and resend the canceled suborders to another of the market participants. Likewise, the server system will cancel any of the suborders not filled by the expiration of the order timer. As such, the computer based system and method for obtaining the best fill for an order using automated suborders obtain the best price for the portion of the order that is filled.

BRIEF DESCRIPTION OF THE DRAWINGS

For a more complete understanding of the present invention, including its features and advantages, reference is now made to the detailed description of the invention, taken in conjunction with the accompanying drawings of which:

FIG. 5 is a block diagram of order routing and execution to an ECN using a system for integrating trade executions among multiple market participant types of the present invention;

FIG. 6 is a block diagram of order routing and execution to a market maker using a system for integrating trade executions among multiple market participant types of the present invention;

DETAILED DESCRIPTION OF THE INVENTION

Figure 1:
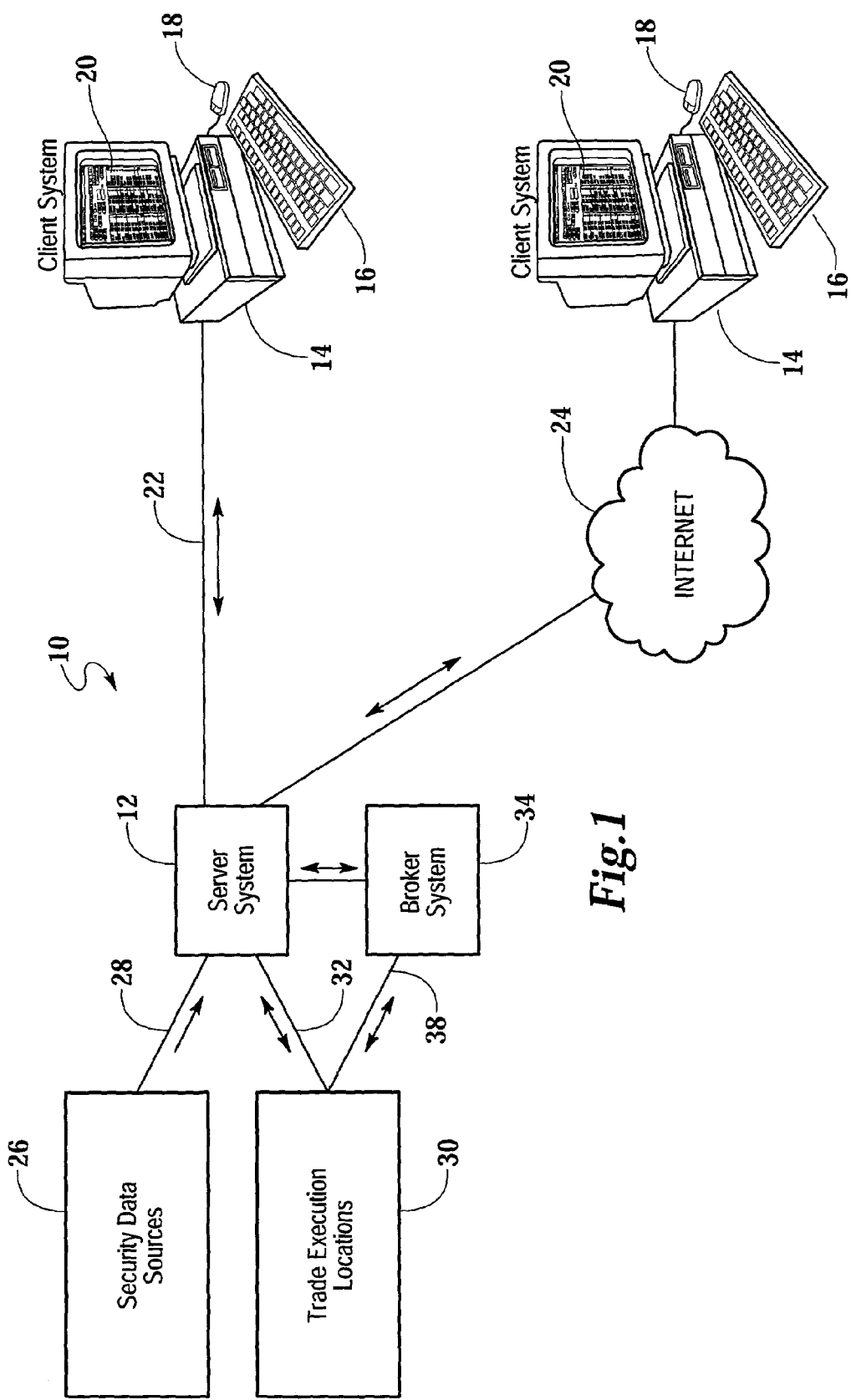
FIG. 1 is a platform diagram of a system for integrating trade executions among multiple market participant types of the present invention.

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the invention.

Before describing the computerized method and system for integrating trade executions among multiple market participant types and for obtaining the best fill for an order using automated suborders of the present invention in detail, the following definitions are now presented which should be helpful in the understanding of the present invention.

Electronic Communications Network (ECN): A market participant type that provides an electronic system that widely disseminates orders to third parties and permits such orders to be executed against in whole or in part. While the term ECN generally applies only to those private networks that have been recognized as such under the Securities Exchange Act, as used herein, the term ECN will apply generally to all alternative trading systems that utilize electronic systems for automatically matching orders between buyers and sellers. There are numerous ECNs including, but not limited to, Isld, Inca, Arca, Redi, Attn, Btrd, Strk, Ntrd, Brut, Market XT and the like.

Market Maker (MM): A market participant type wherein individuals or securities firms use their own capital to buy and maintain an inventory in a specific company's stock. A market maker quotes both bid prices at which it will buy additional inventory and offer prices at which it will sell its inventory. Typically when a market maker receives an order to buy shares in a particular stock, it sells those shares to the customer from its existing inventory and, if necessary, buys additional shares from other market makers to complete the sale. There are hundreds of market makers including, but not limited to, MONT, GSCO, PRUS, FACT, MLCO, DLJP, BEST, MADF, DBKS and the like.

Exchange: A market participant type that provides a market place of facilities for bringing together purchasers and sellers of securities. The term exchange as used herein will include agency auction markets designed to allow the public to meet the public as much as possible with a single specialist making the market in each security. Examples of such exchanges are the New York Stock Exchange (NYSE), the American Stock Exchange (AMEX) and the like. In addition, the term exchange as used herein will include markets made up of competing market makers that list specific prices for the sale or purchase of securities. An example of such an exchange is the NASDAQ stock market and the like.

Market Participant Type: Any one of a number of types of trade execution locations such as ECNs, market makers, exchanges and the like.

Market Participant: A specific trade execution location such as Isld, (a specific ECN), MLCO, (a specific market maker), NYSE, (a specific exchange) and the like. As used herein, the terms market participant and trade execution location may be used synonymously.

Referring now to FIG. 1, therein is depicted a platform layout of the system for the integrating trade executions among multiple market participant types and obtaining the best fill for an order using automated suborders of the present invention that is generally designated 10. As illustrated, system 10 includes a server system 12 and a pair of client systems 14. Client systems 14 may include any number of peripheral input, storage and display devices such as a keyboard 16, a mouse 18 and a monitor 20. Server system 12 may communicate with each client system 14 by any suitable means. In one illustrated embodiment, server system 12 is in communication with a client system 14 via a direct connection 22 such as a T1 line, a frame, a dial up modem or the like. In the other illustrated embodiment, server system 12 is in communication with the other client system 14 via an Internet connection 24.

Server system 12 is also in communication with one or more security data sources 26 via a T1 line, a high speed modem or other transmission line 28 using, for example, a direct socket connection such as a TCP/IP connection. Security data sources 26 provide data feeds to server system 12 from a plurality of sources such as PC Quote, S&P Comstock, NQDS and the like that contain all types of information relating to thousands of securities that are traded at the various market participants. The data feeds contain a variety of information relating to each security. For example, the data feeds may contain level I information, which is best ask and best bid information as well as time and sales information and level II information which includes detailed market information. In addition, the data feeds may include fundamental information such as market capitalization, sector information, price to earning ratio, 52 week highs and lows and the like. It should be noted by those skilled in the art that the term security as used herein refers to stocks, bonds, options and the like that are traded at the various market participants.

Server system 12 includes an application programming interface that takes each data feed from the various security data sources 26, which are typically in a proprietary format, and processes it for real-time dissemination to client systems 14. As the amount of information received and processed by server system 12 from security data sources 26 is voluminous, each client system 14 typically receives only the information that the user of that client system 14 requests. As such, each client system 14 requests and receives only a small subset of the information processed by server system 12. For example, one user may be interested in securities that are approaching a 52-week high and that have a five day average volume above a particular threshold. In this case, the user would make the appropriate request from a client system 14 to the server system 12 for processing. The server system 12 then returns only the information relating to the securities that meet this user's criteria to that client system 14. Likewise, another user may be interested in securities having a high current volume that fall within a particular price range. Again, in this case, the user would make the appropriate request from a client system 14 to server system 12 which would return only the information relating to the securities that meet this user's criteria to that client system 14.

Server system 12 is also in communication with a plurality of trade execution locations 30 via a T1 line, a high speed modem or other transmission line 32 using, for example, a direct socket connection such as a TCP/IP connection. Trade execution locations 30 include the various market participants of numerous market participant types, such as, exchanges, market makers, ECNs and the like. Server system 12 receives orders from client systems 14. The orders are processed in server system 12 and routed to the appropriate trade execution location 30 where the orders may be filled.

More specifically, server system 12 includes an application programming interface that takes each order from the client systems 14 and places that order in the required format, which is typically a proprietary format, depending upon which trade execution location 30 is to receive the order. The specific trade execution location 30 to which server system 12 sends a particular order is determined by a number of factors. For example, the user of the client system 14 originating the order may request a particular execution method such as execution at a specific market participant type or even a specific market participant. Similarly, the particular type of order placed by the user of the client system 14 may dictate that the order be sent to a market participant type or specific market participant. Alternatively, server system 12 may automate the selection of the trade execution location 30 based upon factors such as the liquidity of the security at a particular trade execution location 30, the speed at which a particular trade execution location 30 fills orders, the ratio of orders filled at a particular trade execution location 30 and the like.

Server system 12 is also in communication with one or more broker systems 34 via a high speed connection 36 such as a T1 line or high speed modem using, for example, a direct socket connection such as a TCP/IP connection. Certain types of trade execution orders from a client system 14 may be routed to broker system 34 based upon a request by the user of client system 14, the order parameters selected by the user of client system 14 or based upon an automated decision in server system 12. In the illustrated embodiment, broker system 34 communicates with various trade execution locations 30 including multiple market participant types via communications link 38 which may be a high speed connection such as a T1 line, high speed modem or the like or which may be a manual telephonic communication or the like.

As such, system 10 not only allows the user of client systems 14 to perform substantially real-time trade executions via server system 12 and trade execution locations 30 selecting among various market participant types, but also, allows the users of client systems 14 to execute trades using broker system 34 via server system 12.

Figure 2:
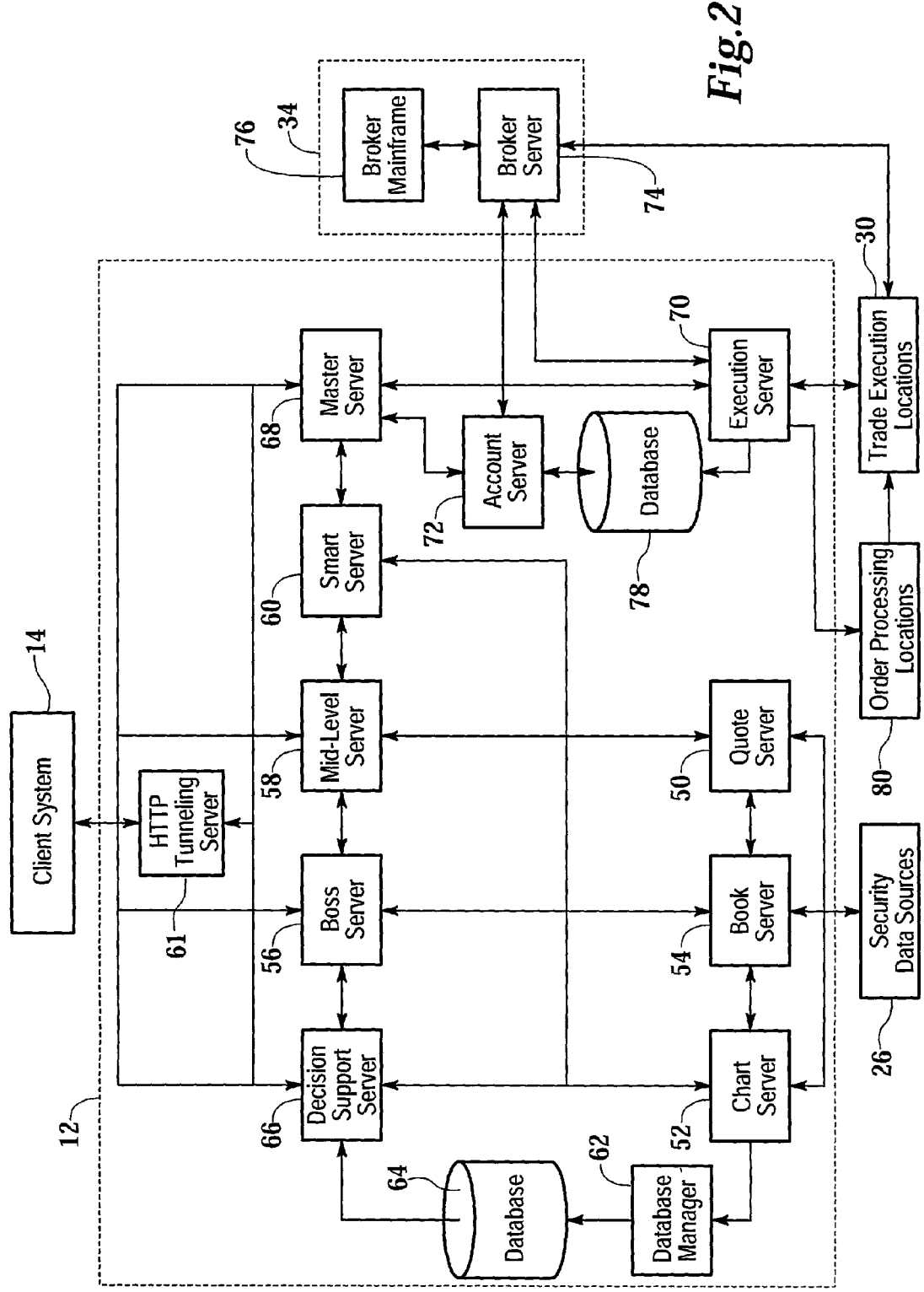
FIG. 2 is a block diagram of a server system of a system for integrating trade executions among multiple market participant types of the present invention.

Referring now to FIG. 2, therein is depicted a more detailed diagram of server system 12 of the system of the present invention. Server system 12 comprises numerous integrated servers that enable the processing of security data received from security data sources 26 for dissemination to various client systems 14 based upon the request made from each client system 14 and that route orders generated by the user of client systems 14 to various trade execution locations 30 which include multiple market participant types.

Specifically, server system 12 includes a quote server 50, a chart server 52 and book servers 54. Quote server 50 receives the data feed from one or more of the security data sources 26 and parses the data based upon the feed parsing API. The parsed information may be sent via direct connection to a client system 14 upon request by a client system 14. In the illustrated embodiment, however, the connection between quote server 50 and client system 14 includes a mid-level server 58 and an HTTP tunneling server 61 as will be explained in more detail below. As such, quote server 50 may disseminate real-time first level security data, real-time second level security data and the like to client system 14. For speed of delivery to client systems 14, some of this data preferably resides in the cache memory of quote server 50 or may alternatively reside in RAM on mid-level server 58.

Chart server 52 receives the data feed from one or more of the security data sources 26 and parses the data based upon the feed parsing API. The parsed information is further processed by database manager 62 such that information relating to the securities may be stored in database 64. Database 64 is used for historical charting of security data. For example, database 64 builds one, two, three and five minute charts for intraday activity as well as historical charts for daily volume, daily highs and lows and the like for specified time increments such as the prior week, month or year. Database 64 is preferably an in-memory database utilizing cache memory and RAM such that information requested by a client system 14 can be quickly disseminated.

Book server 54 receives the data feed from one or more of the security data sources 26 and parses that data based upon the feed parsing API. More specifically, each book server 54 receives book data from, for example, an ECN or a market maker. The book data feeds contain not only the first and second level security data but also information relating to all the available asks and bids of each security.

Mid-level server 58 monitors information on a subset of the securities on which data feeds are received. While quote server 50, chart server 52 and book server 54 monitor all securities, perhaps 12,000 to 15,000 or more, mid-level server 58 only monitors those securities that are frequently requested by a client system 14, perhaps several hundred to a few thousand. For example, mid-level server 58 monitors all open positions that users presently have as well as additional securities that are being watched by such users, for example, those that are part of real-time user requests. Use of mid-level server 58 adds flexibility to server system 12 by reducing the load on the other servers. In addition, the use of mid-level server 58 enhances the speed at which information is disseminated to client systems 14 by, among other things, gathering, combining and placing in cache memory data from quote server 50, chart server 52 and book server 54 such that a request from a client system 14 does not have to be processed by more than one server.

It should be understood by those skilled in the art that the use of the term server herein may mean a single physical server, multiple physical servers or multiple instances of an execution on a single physical server. For example, it is preferable to have multiple quote servers, at least one for each security data source as well as multiple book servers, at least one for each market participant providing book data. Likewise, it is preferable to have multiple chart servers and multiple mid-level servers depending upon the amount of information being processed. Also, it should be understood by those skilled in the art that the servers described herein that make up server system 12 may comprise any suitable processor. For example, a Dell dual 500 MHZ processor with 512 MB of memory operating on a Microsoft Windows NT 4.0 platform has been found to be suitable.

In addition to the above described servers, server system 12 may include a boss server 56 that manages the operation of the other servers. Boss server 56 optimizes the processing of server system 12 by routing connection requests from client systems 14 to the servers within server system 12, for example, to a specific mid-level server 58, that is presently operating with appropriate capacity to handle the new connection to avoid overloading any of the servers.

Server system 12 includes smart server 60 that processes orders received from client systems 14, such that the best fill for that order is obtained. As explained in greater detail below, smart server 60 parses the order into a plurality of suborders, each of which are sent to a trade execution location 30 to be filled. When all of the suborders are filled, at the best price for that suborder, the best price is obtained for the order.

For connection between server system 12 and client systems 14 over the internet, server system 12, may also include HTTP tunneling server 61. HTTP tunneling server 61 allows client systems 14 to work through fire walls, proxy servers and the like.

Server system 12 includes a decision support server 66. As with the mid-level server 58, decision support server 66 performs specific tasks which enable server system 12 to be more responsive to client systems 14. Decision support server 66 provides a data feed to client systems 14 that helps a user of a client system 14 to select a security of interest. In the illustrated embodiment, decision support server 66 receives data feeds from chart server 52 and quote server 50. In addition, decision support server 66 receives a data feed from data compiled in database 64.

Server system 12 also includes a master server 68 and an execution server 70. Client systems 14 may connect directly to master server 68 or may connect through HTTP tunneling server 61. In either case, once a user of a client system 14 connects to server system 12, client system 14 receives IP addresses from boss server 56 then connects to master server 68. Master server 68 loads information relating to that user into memory from account server 72. Account server 72 retrieves user information via a connection to broker server 74 located remotely at broker system 34. Broker server 74 queries a broker mainframe 76 for the required information. The information is then passed back to account server 72 via broker server 74. Account server 72 then populates the cache memory of master server 68 with the client information.

Account server 72 also sends the client information to a database 78, to repopulate the client information in database 78 and to update any discrepancies between client information in database 78 and broker mainframe 76. In addition, to assure a high level of availability, if the client information cannot be obtained from broker system 34, account server 72 may alternatively obtain the client information previously stored in database 78.

Once master server 68 has received the client information, master server 68 monitors orders from client system 14 and performs compliance checks on the orders. For example, master server 68 would reject an order from client system 14 if the user attempts a trade that exceeds the user's buying power. Likewise, master server 68 would disallow an order from client system 14 that would be in violation of securities regulations such as an order that would be in violation of the Soes five minute rule. Once the compliance checks are completed, master server 68 sends the order to execution server 70.

Execution server 70 receives the orders from master server 68. Execution server 70 then routes the orders directly to a trade execution location 30, such as the ECN of Isld or the market maker of BEST, indirectly to a trade execution location 30 via an order processing location 80, such as SOES or Select Net for a NASDAQ trade or Super DOT for an NYSE trade, or indirectly to a trade execution location 30 via broker system 34. For example, a user may request execution at a specific market participant, such as Isld, in which case execution server 70 will send the order directly to the requested trade execution location 30. Alternatively, the user may request execution at a specific market participant type, such as any ECN, but may allow server system 12 to automate the selection of the specific ECN as explained in greater detail below. In such a case, server system 12 may select a trade execution location 30 based upon factors such as the liquidity of the security at a particular trade execution location 30, the speed at which a particular trade execution location 30 fills orders, the ratio of orders filled at a particular trade execution location 30 and the like. In either case, once the trade execution location 30 is selected, the order is formatted for the proprietary application programming interface of that trade execution location 30 by execution server 70. The order is then sent to that trade execution location 30 to be filled.

If the user of client system 14 were to request that the order be sent to a specific market participant type, such as an exchange, execution server 70 would send the order to an order processing location 80 which would process the order according to its rules and forward the order to the exchange to be filled. As another example, the user of client system 14 may request that a trade be executed using particular order parameters that require broker intervention. In such a case, execution server 70 would send the order to broker system 34 where the order is processed and forwarded to an appropriate trade execution location 30.

Figure 3:
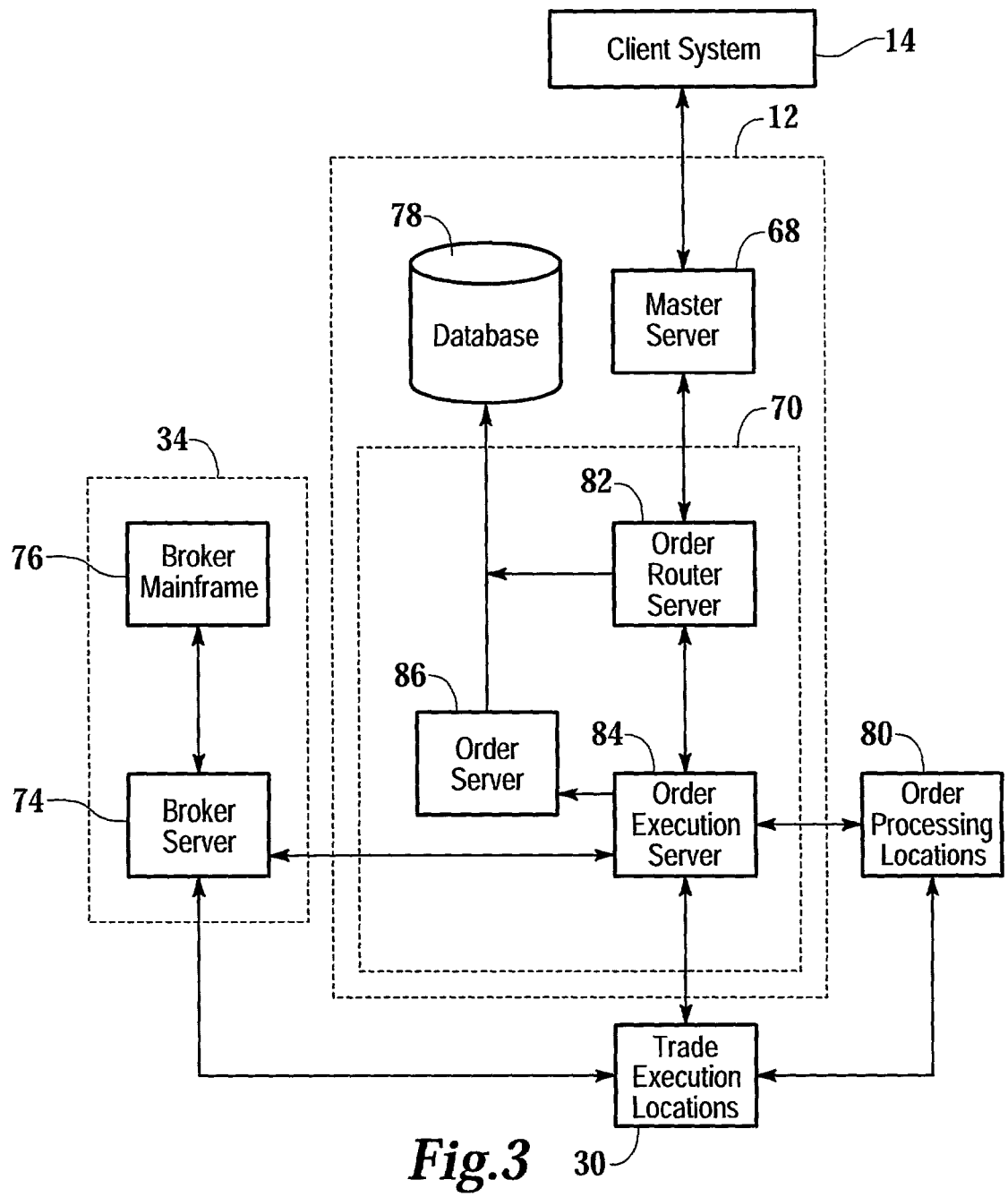
FIG. 3 is a block diagram detailing the operation of an execution server of a system for integrating trade executions among multiple market participant types of the present invention.

Referring now to FIG. 3, therein is depicted a more detailed diagram of the servers that comprise execution server 70 of the system for integrating trade executions among multiple market participant types of the present invention. As explained above, client systems 14 send orders to master server 68 wherein the orders are processed and compliance checks are performed. Master server 68 sends the orders, which satisfy the compliance checks, to execution server 70. Execution server 70 includes an order router server 82 and an order execution server 84.

As an example, if the market participant type for trade execution selected by the user of client system 14 is an exchange, such as NASDAQ, master server 68 will send the order to order router server 82 which will route the order to order execution server 84 where the order is formatted for the application programming interface of, for example, a NASDAQ trade via SOES. The order is then sent to the order processing location 80 of SOES where the trade is processed based upon the SOES trading methodology and sent to the trade execution location 30 of NASDAQ for execution.

In a similar manner, if the desired market participant type is an exchange and the desired security is listed on the NYSE, master server 68 will send the order to order router server 82 which will route the order to order execution server 84 where the order is formatted and forwarded to the order processing location 80 for NYSE trades, for example Super DOT, then to the trade execution location 30 of the floor of the NYSE for execution. Additionally, in either of these cases where the market participant type is an exchange, order execution server 84 will in some cases send the order to broker system 34 for processing prior to execution of the trade at the desired exchange.

Alternatively, if the market participant type selected by the user of client system 14 is an ECN, such as the trade execution location 30 of Isld, master server 68 will send the order to order router server 82 which will route the order to order execution server 84 where the order is formatted for the application programming interface for a trade on Isld. The order is then sent to Isld for execution.

Similarly, if the market participant type selected by the user of client system 14 is a market maker, such as the trade execution location 30 of Schwab Capital Markets, master server 68 will send the order to order router server 82 which will route the order to order execution server 84 where the order is formatted for the application programming interface for a trade at Schwab Capital Markets. The order is then sent to Schwab Capital Markets for execution. In addition, routing an order to the market participant type of a market maker may be accomplished by sending an order from order execution server 84 to broker system 34 for processing prior to execution of the trade at the desired market maker.

In all of these scenarios, information relating to the trade executions must be stored. Database 78 receives and stores all of the information relating to the orders routed by order router server 82. Likewise, database 78 receives and stores all of the information relating to the orders sent by order execution server 84 which are processed by order server 86 prior to storage in database 78. Information received from trade execution locations 30 is also stored in database 78. This execution information from trade execution location 30 returns to server system 12 in substantially the reverse flow paths of the orders sent from server system 12 to trade execution location 30.

Figure 4:
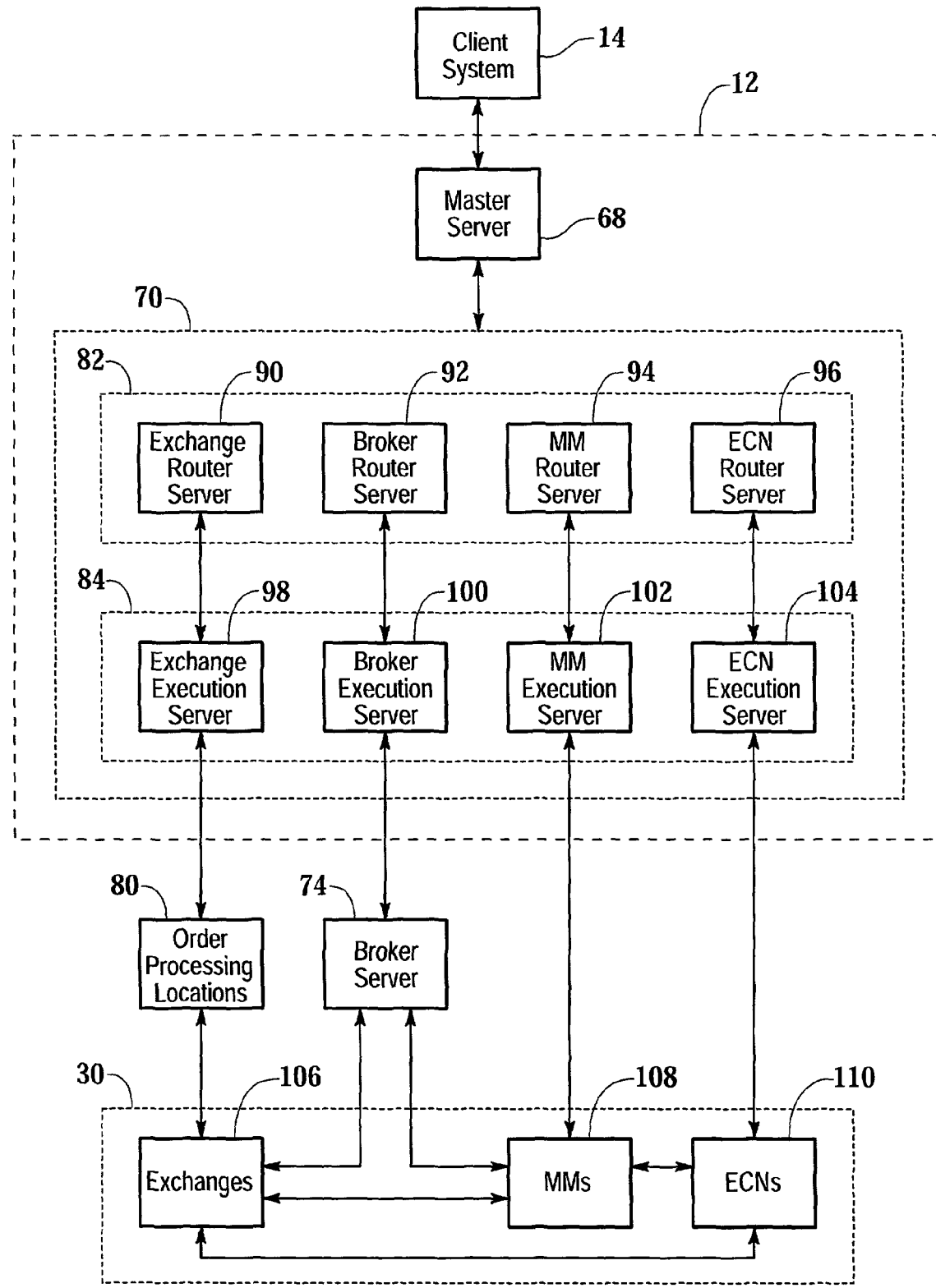
FIG. 4 is a block diagram of order routing and execution using a system for integrating trade executions among multiple market participant types of the present invention.

Referring now to FIG. 4 therein is depicted a more detailed diagram of the servers that comprise execution server of the system for integrating trade executions among multiple market participant types of the present invention. Specifically, order router server 82 includes an exchange router server 90, a broker router server 92, a market maker router server 94 and an ECN router server 96. Likewise, order execution server 84 comprises an exchange execution server 98, a broker execution server 100, a market maker execution server 102 and an ECN execution server 104. In the illustrated embodiment, trade execution locations 30 include three market participant types. Specifically, exchanges 106, market makers 108 and ECNs 110. As can be seen in FIG. 4, execution server 70 has several direct connections to particular market participant types and has several indirect connections to particular market participant types.

Specifically, there is a direct connection between ECN execution server 104 and ECNs 110. Likewise, there is a direct connection between market maker execution server 102 and market makers 108. In addition to the direct connection to market makers 108, there are also two indirect paths to execute a trade at a market maker 108. Specifically, broker execution server 100 is used to send orders to broker server 74 which provides information to send the order to a market maker 108. Also, exchange execution server 98 may be used to route an order to an order processing location 80 which in turn routes the order to an exchange 106 which may execute a trade with a market maker 108.

In a like matter, there are two indirect paths for executing a trade on an exchange 106. Specifically, broker router server 92 may route an order to broker execution server 100 which in turn sends the order to broker server 74 for appropriate processing and routing to an exchange 106. Alternatively, exchange router server 90 may route the order to exchange execution server 98 that sends the order to an order processing location 80 where the order is processed and then executed at an exchange 106. As such, the system of the present invention provides for the integration of trade executions among multiple market participant types. Specifically, the system of the present invention allows a user of client system 14 to execute trades at market participant types such as exchanges 106, market makers 108 and ECNs 110 from client system 14 via a single user interface. Selection of the specific market participant type as well as the specific trade execution location 30 may be determined by the user of client system 14 or may be determined using an automated process within server system 12.

Referring now to FIG. 5, therein is depicted a block diagram for order flow to an ECN. Once client system 14 is properly logged into server system 12, the user of client system 14 may request the execution of an order at a preselected market participant type such as ECNs 110. The order from client system 14 is initially received by master server 68 which performs order edits, compliance validation, credit checks and assigns an order number to the order. Master server 68 then sends the order to ECN router server 96. ECN router server 96 routes the order to ECN execution server 104.

In addition, information associated with the order is routed from ECN router server 96 to database 78 for storage. ECN execution server 104 then sends the order via a direct connection to an ECN 110. ECN execution server 104 also sends information associated with the order to order server 86. Order server 86 forwards this information to database 78 and to broker server 74. Broker server 74 sends the information associated with the order to broker mainframe 76 for storage. Once the trade is executed at ECN 110, an execution report is returned to ECN execution server 104. This information is passed back to client system 14 so that the user of client system 14 will know when the requested order has been executed. Also, ECN execution server 104 forwards the execution report to order server 86 which again forwards the information to database 78 and broker mainframe 76 via broker server 74 such that the execution report information is redundantly stored in database 78 and broker mainframe 76.

Referring now to FIG. 6, therein is depicted a block diagram for the execution of a trade at a market maker. Once the user of client system 14 is properly logged into server system 12 the user of client system 14 may request that an order be executed at a market maker 108. This order is sent from client system 14 to master server 68 where compliance checks are performed. Master server 68 then sends the order to market maker router server 94. Market maker router server 94 routes the order to market maker execution server 102 and sends information relating to the order to database 78. Market maker execution server 102 then sends the order to market maker 108 via a direct connection. Market maker execution server 102 also sends information relating to the order to order server 86. Order server 86 then sends this information to database 78 and to broker mainframe 76 via broker server 74 for storage. Once the trade is executed by market maker 108, an execution report is returned to market maker execution server 102. The execution report is forwarded to client system 14 and to database 78 and broker mainframe 76, as described above, for storage.

Figure 7:
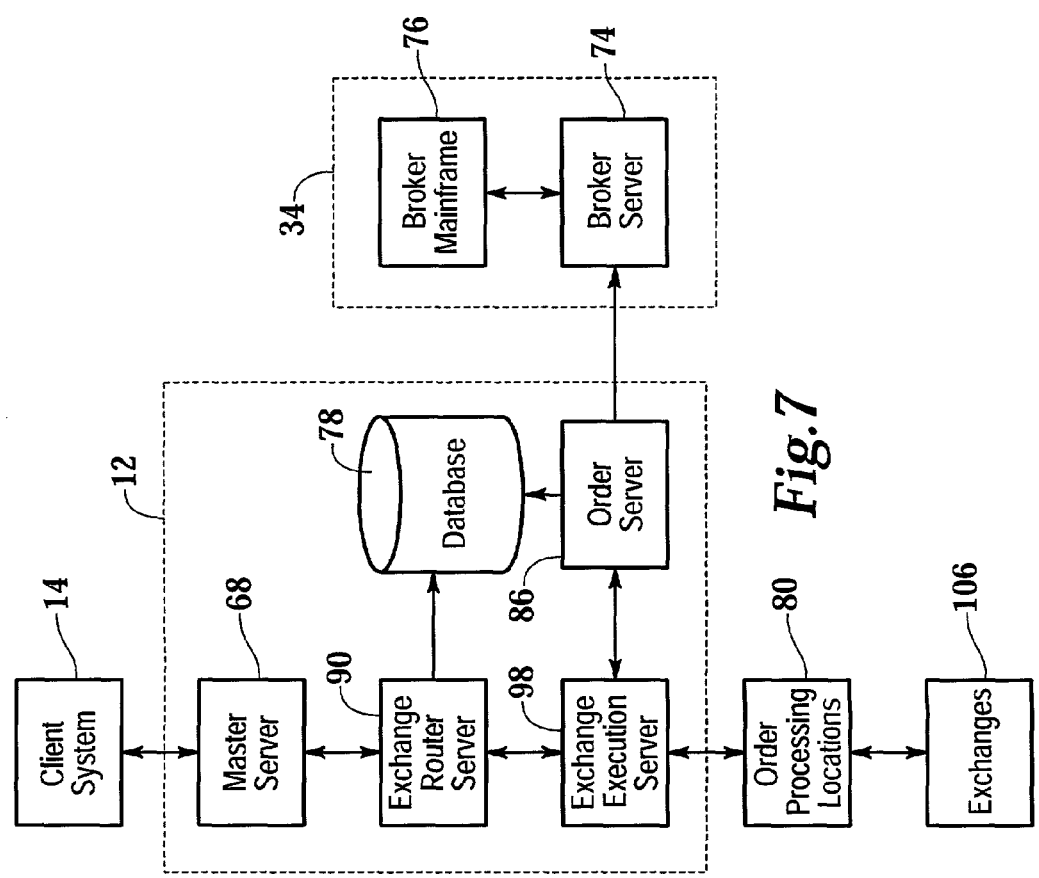
FIG. 7 is a block diagram of order routing and execution to an exchange using a system for integrating trade executions among multiple market participant types of the present invention.

Referring now to FIG. 7, therein is depicted a block diagram of order executions at an exchange. Once client system 14 is properly logged into server system 12, the user of client system 14 may send an order that is to be executed at an exchange 106. This order is initially received by master server 68 for compliance checks. Thereafter, master server 68 sends the order to exchange router server 90. Exchange router server 90 routes the order to exchange execution server 98 and sends information associated with the order to database 78. The order is then sent via an indirect connection to an exchange 106 from exchange execution server 98. Specifically, exchange execution server 98 sends the order to an order processing location 80 that processes the order then the order is forwarded to an exchange 106. As an example, if exchange 106 is NASDAQ, the order processing location 80 may be SOES or Selectnet. Alternately, if exchange 106 is NYSE, then the order processing location 80 may be Super DOT. In addition to sending the order to an order processing location 80, exchange execution server 98 sends information relating to the order to order server 86. Order server 86 then forwards the information to database 78 and broker mainframe 76 for storage. Once the order is executed at exchange 106, an execution report is generated that is sent to the order processing location 80 which forwards the execution report to exchange execution server 98. The order execution information is then forwarded to client system 14, database 78 and broker mainframe 76 as described above.

Figure 8:
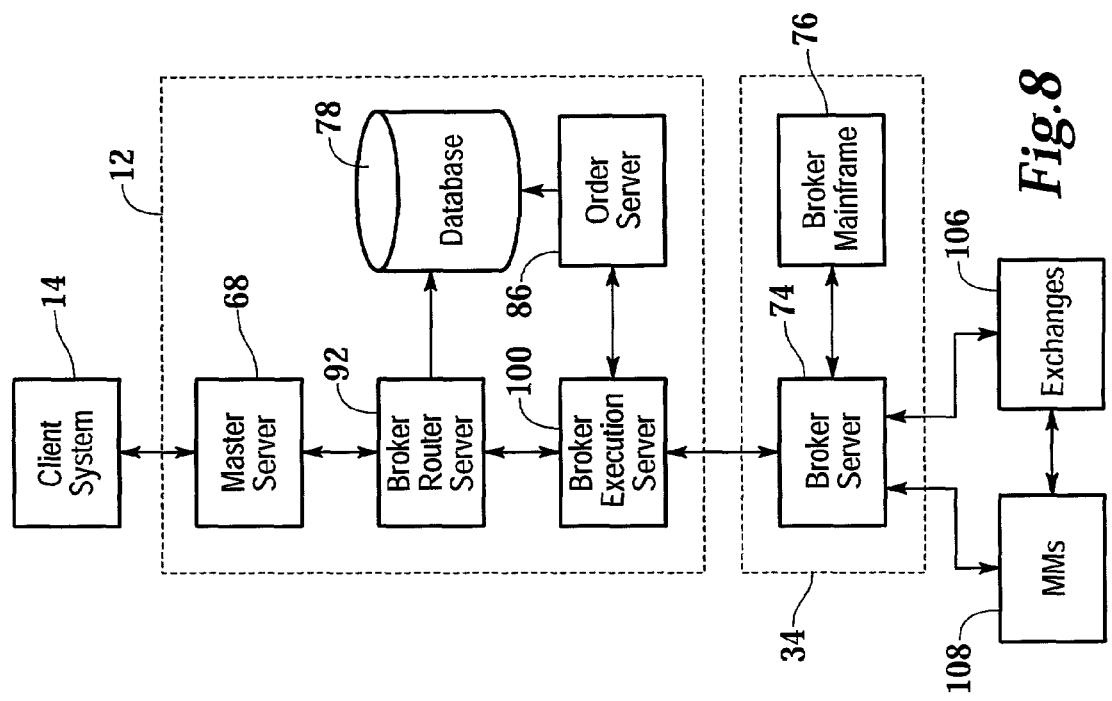
FIG. 8 is a block diagram of order routing and execution through a broker using a system for integrating trade executions among multiple market participant types of the present invention.

Referring now to FIG. 8, therein is depicted a block diagram of an order execution using broker system 34. Once client system 14 is logged into server system 12, the user of client system 14 may generate an order that is to be sent to broker system 34 for traditional order execution. Specifically, the order from client system 14 is received by master server 68 where compliance checks are performed. Master server 68 then sends the order to broker router server 92. Broker router server 92 routes the order to broker execution server 100 and sends information relating to the order to database 78. Broker execution server 100 then sends the order to broker server 74. Information relating to the order is also sent by broker execution server 100 to order server 86 which forwards the information to database 78. Likewise, broker server 74 sends information relating to the order to broker mainframe 76 for storage. Broker server 74 may then send the order directly to a market maker 108 or an exchange 106 for execution. Alternatively, depending upon the order parameters, the order may be held open within broker system 34 until, for example, the price of a particular stock reaches a particular price, at which time the order may be sent to an exchange 106 or a market maker 108 for execution. After the order is executed by an exchange 106 or marker maker 108, an execution report is generated which is returned to broker server 74. Broker server 74 sends this information to broker mainframe 76 for storage. In addition, the execution report may be returned to broker execution server 100 and forwarded to client system 14 and database 78.

As should be apparent to those skilled in the art, the system of the present invention provides significant versatility to a user of client system 14 in executing trades among multiple market participant types. As described with reference to FIGS. 5-8, the user of a client system 14 may select a particular market participant type for the execution of a trade. In addition, based upon certain parameters input by a user of client system 14 associated with an order, the selection of a particular market participant type may be automated within server system 12, broker system 34 or both.

Figure 9:
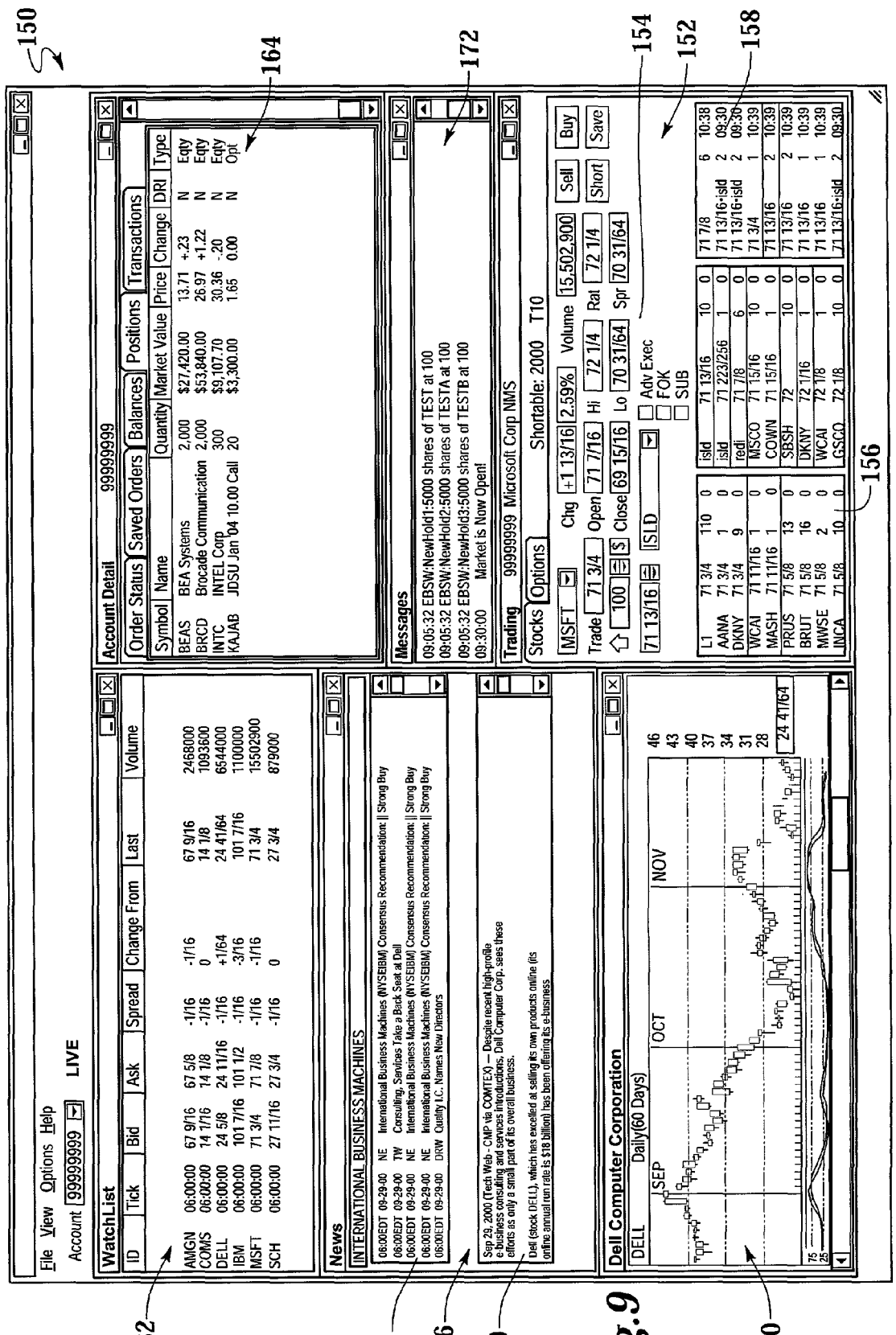
FIG. 9 is a graphical user interface depicting a security trading environment for displaying information relating to securities and for initiating trade executions therefrom of the present invention.

Referring next to FIG. 9, therein is depicted a graphical user interface which provides a security trading environment for the user of system 10 of the present invention that is generally designated 150. Security trading environment 150 is generated on display system 20 by the computer program operating in client system 14. The information displayed within security trading environment 150 is sent from server system 12 to client system 14 as described above.

Security trading environment 150 displays security information and accepts inputs from a user to initiate trade executions in a trade window 152. In the illustrated embodiment, trade window 152 has a level I information section 154, a level II information section 156 and a time and sales information section 158. Trade window 152 also has plurality of buttons that accept input from the user to initiate trade executions including a buy button, a sell button, a short button and a save button.

Security trading environment 150 also displays security information in a chart format in a chart window 160. For example, the displayed charts may include intra-day charts having various time intervals such 1, 2, 3 and 5 minute intervals and the like, intra-day charts with multi-day historical data, multi-day, multi-week, multi-month or multi-year historical charts or other types of charts that are known in the art. Chart window 160 may display a single chart for a single user selected security, multiple charts for a single user selected security or multiple chart for multiple user selected securities.

In addition, security trading environment 150 displays security information in a watchlist window 162. Watchlist window 162 contains information relating to one or more groups of securities that are definable by the user. For example, one group of securities that is displayable in watchlist window 162 is the group of securities in which the user currently holds open positions. Another group may include securities from a particular sector that the user is interested in or simply a group of the users favorite securities. For each security in the group of securities in each list, numerous data fields, which are customizable by the user, provide information relating to that security. For example, level I information may be provided for each security. In the illustrated embodiment, eight fields are depicted including, a security ID or symbol data field, a Tick data field, a Bid data field, an Ask data field, a Spread data field, a Change From data field, a Last data field and a Volume data field. These data fields are updated in real-time using the data feed from server system 12.

Security trading environment 150 also displays security information relating to securities in which the user has positions, in an account detail window 164. Account manager window 164 is used to track all trades, open orders, positions and the profit/loss of the user. In the illustrated embodiment, account manager window 164 has multiple pages including an order status page, a saved orders page, a balances page, a positions page and a transactions page. The user may select a desired page for viewing in account manager window 164. For example, the order status page displays all orders made by the user during a selected period of time such as during a particular trading day. The order page provides the user with information regarding orders such as whether the order is live, completely filled, rejected, failed, canceled or the like. In addition, the order page will allow the user to cancel any live orders. Likewise, the saved order page displays all orders that are prepared and saved by the user but have not been sent. The balances page displays information relating to the user's account such as equity, buying power and the like. In the illustrated embodiment, the positions page is depicted and it displays all the open positions the user currently has including a substantially real-time profit or loss in each position. In addition, account manager window 164 includes a transactions page which displays all the transactions of the user of client system 14 over a specified period of time.

security trading environment 150 further displays news relating to securities in a news window 166. News window 166 receives streaming information relating to one or more user selected securities which is displayed in real-time. In the illustrated embodiment, news window 166 includes a headlines window 168 that lists the headlines relating to the user selected securities and a story window 170 that displays the text of the entire story that corresponds to the various headlines in headline window 168.

Additionally, security trading environment 150 displays information relating to the trade executions, initiated in trade window 152, in a messages window 172. Specifically, detailed information relating to order status is provided in real-time in messages window 172. For example, information such as when an order is sent, when a trade execution location acknowledges receiving the order, when a trade execution location partially fills, completely fills or rejects the order, when the user cancels the order and the like. The messages provided in messages window 172 may also include information such as the size of the order, the price of the order and the like.

Figure 10:
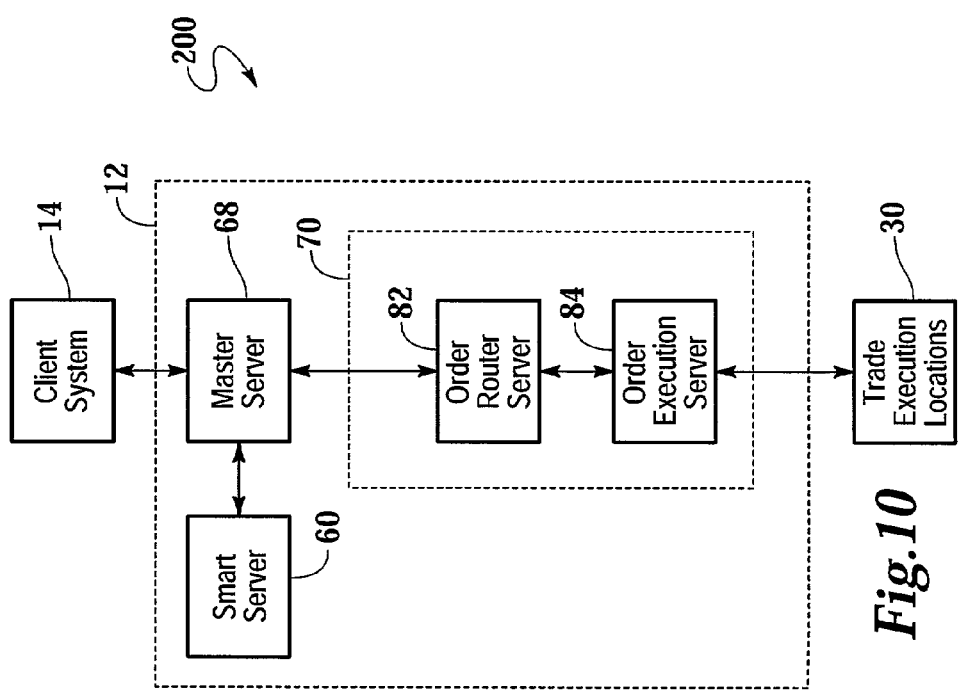
FIG. 10 is a block diagram of a system for obtaining the best fill for an order using automated suborders.

Referring now to FIG. 10, therein is a block diagram of a system for obtaining the best fill for an order using automated suborders that is generally designated 200. In this aspect of the present invention, once a client system 14 is properly logged into the server system 12 and the user of a client system 14 sends an order, server system 12 processes the order to obtain the best price for all shares within the order by automating the process of created multiple suborders. More specifically, server system 12 identifies the various market participants having available shares of the particular security specified in the order. In many cases, the desired number of shares specified in the order maybe greater than the number of shares available from any one market participant.

Figure 11:
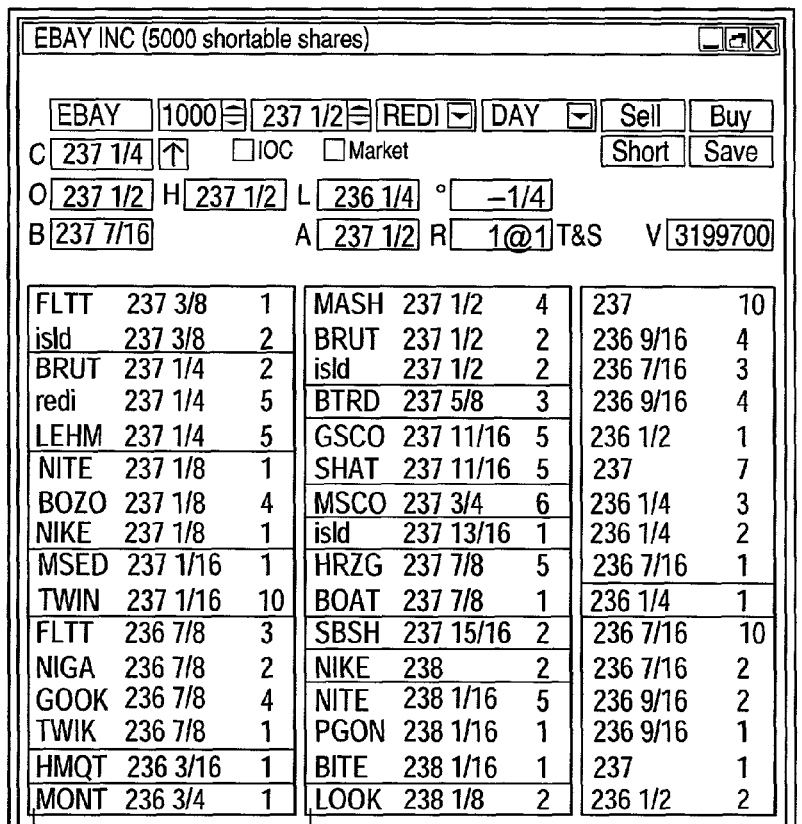
FIG. 11 is a graphical user interface depicting an environment providing level II information and initiating trade executions of the present invention.

For example, and referring to FIG. 11 showing level II data for EBAY in a stock box 202, if the user of client system 14 wants to buy 800 shares of EBAY, no single market participant displays 800 shares available. Specifically, on the ask side 204 of the level II data, MASH has 400 shares available at the inside ask price tier of 237½, BRUT has 200 shares available at the inside ask price tier and isld has 200 shares available at the inside ask price tier. Thus, for the user of client system 14 to buy 800 shares of EBAY, the user of client system 14 would typically have to send three separate orders, one to MASH for 400 shares, one to BRUT for 200 shares and one to isld for 200 shares to obtain the 800 shares. It is likely, however, that before the user of client system 14 can send these three orders to the three different market participants, the shares from one or more of these market participants may no longer be available. As such, for the user of client system 14 to obtain the 1,000 shares, the user may have to send additional orders to additional market participants once the user has been informed that certain orders were not filled. In a fast moving market, within the time it takes to prepare these orders and receive the acknowledgments that certain ones of the orders were not filled, the market may have moved several price tiers such that the user of client system 14 may have to obtain some of the desired 800 shares at the 237⅝ price tier, the 237¹¹⁄₁₆ price tier or even the 237¾ price tier.

Similarly, if the user of a client system 14 wants to sell 1,000 shares of EBAY at the market price, the user would have to send at least four orders to obtain the best price for those 1,000 shares. Specifically, as illustrated, the bid side 206 of the level II data shows 300 shares are available at the inside bid price of 237⅜ with 100 shares being available through FLTT and 200 shares being available through isld. A total of 1,200 shares is available at the next price tier of 237¼. There are 200 shares available through BRUT, 500 shares available through redi and 500 shares available LEHM. In this case, assuming all 300 shares are sold at the inside bid price and the new inside bid price moves to 237¼, the user of client system 14 needs to sell an additional 700 shares. As such, the user must decide to which of the market participants at the 237¼ price tier to send orders. For example, the user of client system 14 may send an order to sell 200 shares at BRUT and 500 shares at either redi or LEHM. Alternatively, the user of client system 14 could split the remaining 700 shares between redi and LEHM in some fashion.

As should be apparent to those skilled in the art, during the time it takes for the user of client system 14 to make such decisions, the shares may no longer be available at the illustrated price tiers. Thus, for the user of client system 14 to sell 1,000 shares of EBAY, more than four orders may have to be placed. In addition, the shares may have to be sold at lower price tiers such as the 237⅛ price tier or the 237¹⁄₁₆ price tier as the market moves.

Referring again to FIG. 10, instead of the user of client system 14 having to send multiple orders to multiple market participants at multiple price tiers, server system 12 has incorporated therein an automated system for dividing orders into suborders within smart server 60. Once master server 68 receives the order from client system 14, the order is forwarded to smart server 60 where the order is automatically parsed into various suborders based upon share availability and pricing at the various market participants. Once the appropriate suborders are created, the suborders are returned to master server 68. Master server 68 then sends each of the suborders to the appropriate order router server 82, as explained above with reference to FIGS. 3-8. Order router server 82 then routes each of the suborders to the appropriate order execution server 84 which in turn sends the suborders to the appropriate trade execution location 30. As each of the suborders is filled at the trade execution location 30, confirmation of these executions is returned to client system 14 via order execution server 84, order router server 82 and master server 68.

Using the example described above, if the user of client system 14 wants to purchase 800 shares of EBAY at the market price, a single order would be sent from client system 14 to server system 12. This order would be received by master server 68 and forwarded to smart server 60. Smart server 60 would identify the 800 shares of EBAY available at the inside ask price tier and specifically the 400 shares available through MASH, the 200 shares available through BRUT and the 200 shares available through isld. Smart server 60 would then prepare three suborders, one for each market participant, and forward these suborders to master server 68. Master server 68 then forwards each of the suborders to execution server 70 where the orders are appropriately routed.

Specifically, execution server 70 routes one suborder for the purchase of 400 shares to the trade execution location 30 of MASH. Likewise, execution server 70 routes suborders for 200 shares to the trade execution location 30 of BRUT and 200 shares to the trade execution location 30 of isld. Use of server system 12 to automate the process of sending suborders to the various market participants having available shares significantly enhances the likelihood that the entire order will be filled at the inside ask price in this illustrated example as the suborders reach the market participants more rapidly then if the user of client system 14 had to prepare each of the suborders.

Likewise, in the other example described above, if the user of client system 14 wants to sell 1,000 shares of EBAY at the market price, this order is sent from client system 14 to master server 68. Master server 68 then forwards this order to smart server 60. Smart server 60 then identifies the market participants presently wanting to buy shares of EBAY. Specifically, smart server 60 identifies the two market participants having shares available at the inside bid price of 237⅜ and the three market participants having shares available at the second price tier level of 237¼. As before, smart server 60 prepares suborders which will be sent to the various market participants. Specifically, smart server 60 will prepare a suborder for the sale of 100 shares at FLTT, and 200 shares at isld. Smart server 60 must then determine to which market participants at the second price tier to send suborders for the remaining 700 shares.

As explained in more detail below, smart server 60 determines which market participant to send the suborders to by sorting the market participants based on a variety of factors such as market participant type, speed at which the available market participants typically execute orders, fill ratio of the available market participants, number of shares available from a market participant and the like. Once smart server 60 determines which market participants should receive the suborders and how many shares each of the market participants should receive, smart server 60 prepares the suborders for the remaining 700 shares and forwards the suborders to master server 68. As described above, master server 68 then forwards the suborders to execution server 70 wherein the suborders are routed to the appropriate trade execution location 30. As should be apparent to those skilled in the art, use of server system 12 to automate the process of sending multiple suborders to achieve the best fill for an order enhances the likelihood that a user of client system 14 will receive the best price for all the shares within an order.

Figure 12:
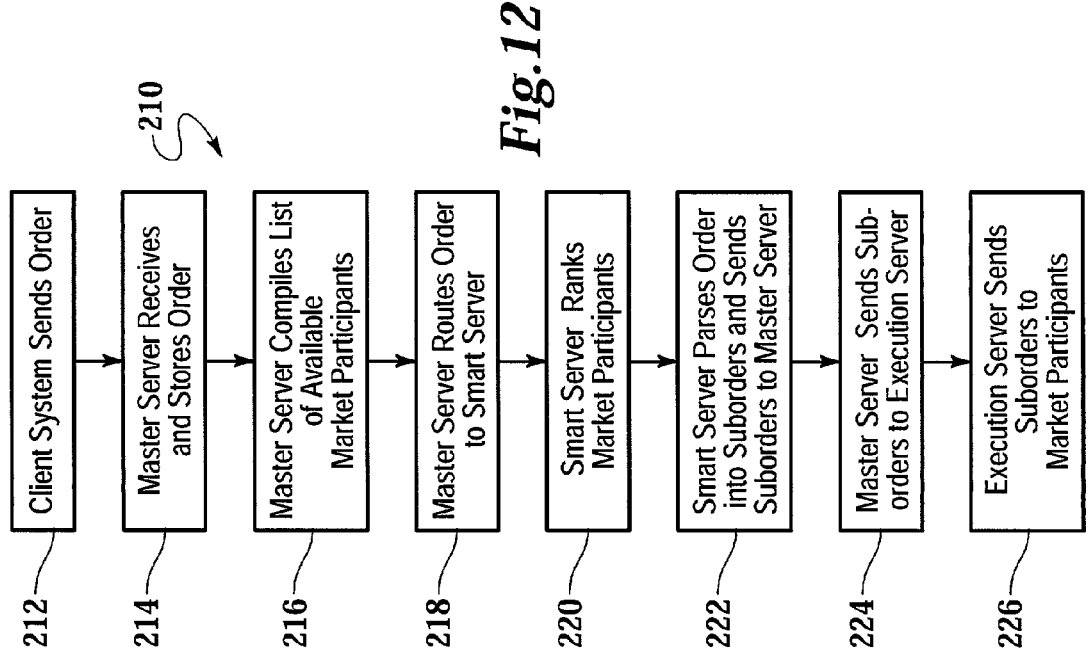
FIG. 12 is a flow diagram of a method for obtaining the best fill for an order using automated suborders of the present invention.

Referring now to FIG. 12, therein is depicted a flow chart of the method for obtaining the best fill for an order using automated suborders of the present invention that is generally designated 210. The process starts at step 212 when an order is sent from the client system. The order is received by the master server in step 214 wherein the master server stores the order. The master server also compiles a list of available market participants in step 216. The master server then routes the order and the list of available market participants to the smart server in step 218. In step 220 the smart server ranks the market participants from the list of available market participants.

The ranking process is based upon the price tier at which each market participant has available shares as well as other market factors as described above including market participant type, speed at which orders are executed, fill ratio of the market participant and the like. Once the smart server 60 ranks the market participants, the smart server parses the order into a plurality of suborders in step 222. Also, in step 222, the smart server sends these suborders back to the master server. In step 224 the master server sends the suborders to the execution server, such that in step 226, the execution server may send each of the suborders to the appropriate market participant to have each of the suborders filled.

Figure 13:
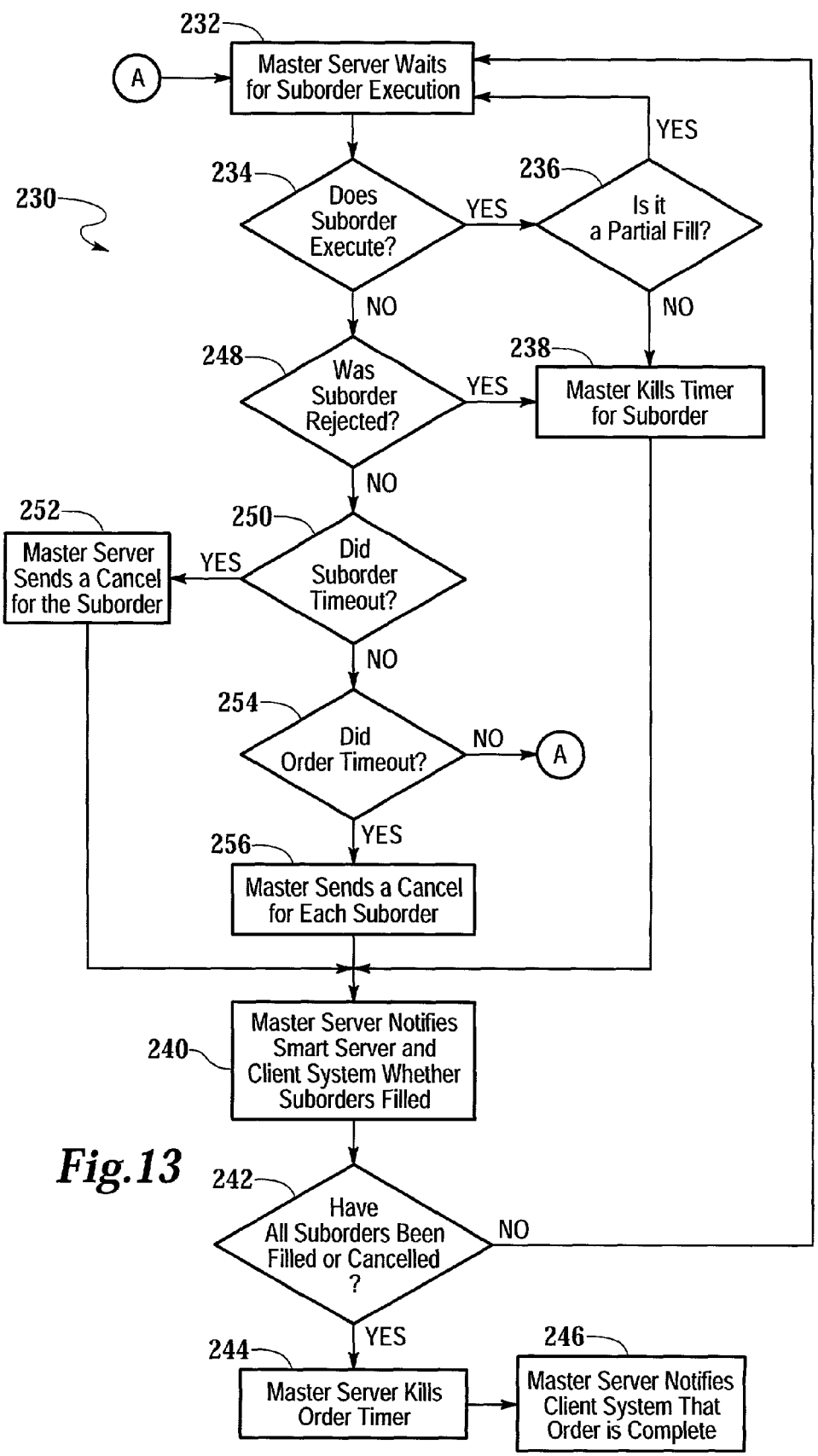
FIG. 13 is a flow diagram of a method for determining whether an order has been completed using the method for obtaining the best fill for an order using automated suborders of the present invention.

Once the suborders are sent to the various market participants, server system 12 must determine if and when all the suborders are filled. Specifically, referring to FIG. 13, therein is depicted a flow diagram of the process for determining whether the suborders have been filled that is generally designated 230. Once the suborders are sent to the various market participants, the master server waits for the execution of the suborders in step 232. As part of step 232, the master server sets a timer for each suborder and timer for the entire order. Process 230 continues for each suborder including decision 234 wherein it is determined whether each of the suborders has executed. If a particular suborder has executed in decision 234, it must then be determined whether that execution is a partial fill of the suborder in decision 236. If the execution is a partial fill in decision 236, then the master server continues to wait in step 232 to see if the remainder of the suborder is filled.

If the execution is a complete fill in decision 236, then the master server kills the timer for that suborder in step 238. Once the master server kills the timer for that suborder, the master server notifies the smart server and the client system that the suborder has been filled in step 240. It must then be determined in decision 242 whether all suborders have been filled or canceled. If all suborders have been filled or canceled, the master server kills the order timer in step 244 and the master server notifies the client system that the order is complete in step 246. If all orders have not been filled or canceled in decision 242, then the master server continues to wait for the execution of the remainder of the suborders in step 232.

For example, if in decision 234 a particular suborder has not executed, then it must be determined, in decision 248, whether the suborder was rejected by the market participant to which the suborder was sent. If the suborder was rejected, the master server kills the timer associated with that suborder in step 238 and the master server notifies the smart server and the client system that the suborder has been rejected in step 240. If all suborders have not been filled, canceled or rejected in decision 242 then master server 232 continues to wait for the execution of the remaining suborders.

Similarly, if a suborder has not executed in decision 234 and the order has not been rejected in decision 248, then it must be determined whether the suborder has timed out in decision 250. If the timer for the suborder has timed out, the master server sends a cancel for that suborder in step 252. The master server then notifies the smart server and the client system that the suborder has been canceled in step 240. If all the suborders have not been filled or canceled in decision 242, the master server continues to wait for the execution of the remaining suborders in step 232.

Returning to decision 250, if the timer for a particular suborder has not timed out, then it must be determined whether the entire order timer has timed out in decision 254. If the entire order has timed out, then the master server sends a cancel for each the remaining suborders in step 256. Once the entire order has timed out, the master server notifies the smart server and the client system that the order has timed out in step 240. Likewise, the master server kills the order timer in step 244 and notifies the client system that the order is complete in step 246. If in decision 254 the order timer has not timed out, the master server continues to wait for the execution of outstanding suborders in step 232.

Figure 14:
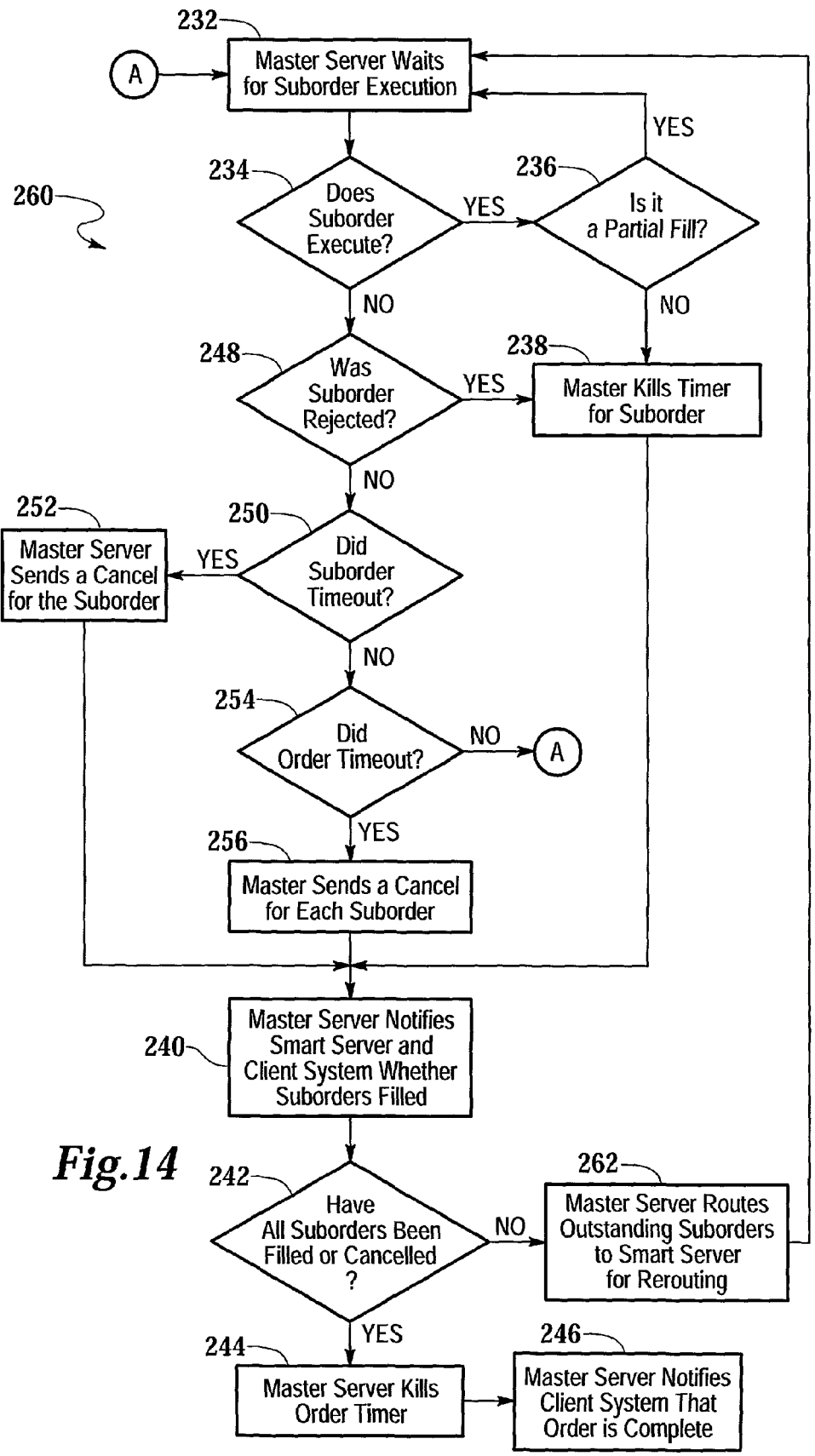
FIG. 14 is a flow diagram of another embodiment of a method for determining whether an order has been completed using the method for obtaining the best fill for an order using automated suborders of the present invention.

Referring now to FIG. 14, therein is depicted a flow chart for another embodiment of the method for determining whether the suborders have been filled that is generally designated 260. Using this embodiment of the present invention, a user of client system 14 not only has the ability to have multiple suborders sent to multiple market participants based upon a single order but may also have certain portions of that order sent multiple times to improve the chances of having a complete fill of the entire order. Process 260 is substantially identical to process 230 as described with reference to FIG. 13 with the addition of step 262 wherein the master server routes outstanding suborders to the smart server for rerouting.

Specifically, if a suborder has not been filled at decision 242 because that suborder has been rejected or that suborder has timed out and been canceled, then the shares associated with that suborder are resubmitted to the smart server such that the smart server may create a new suborder for those shares or multiple new suborders for those shares. These new suborders may then be routed to the appropriate trade execution locations 30 via the execution server 70 as described above. Once these new suborders are so routed, the master server again waits for the execution of these suborders in step 232 as described above. Using this embodiment of the present invention, in the event that all suborders cannot be filled as originally sent by server system 12, the shares associated with those suborders that are not filled may nonetheless get filled by the new suborders created by the smart server.

Figure 15:
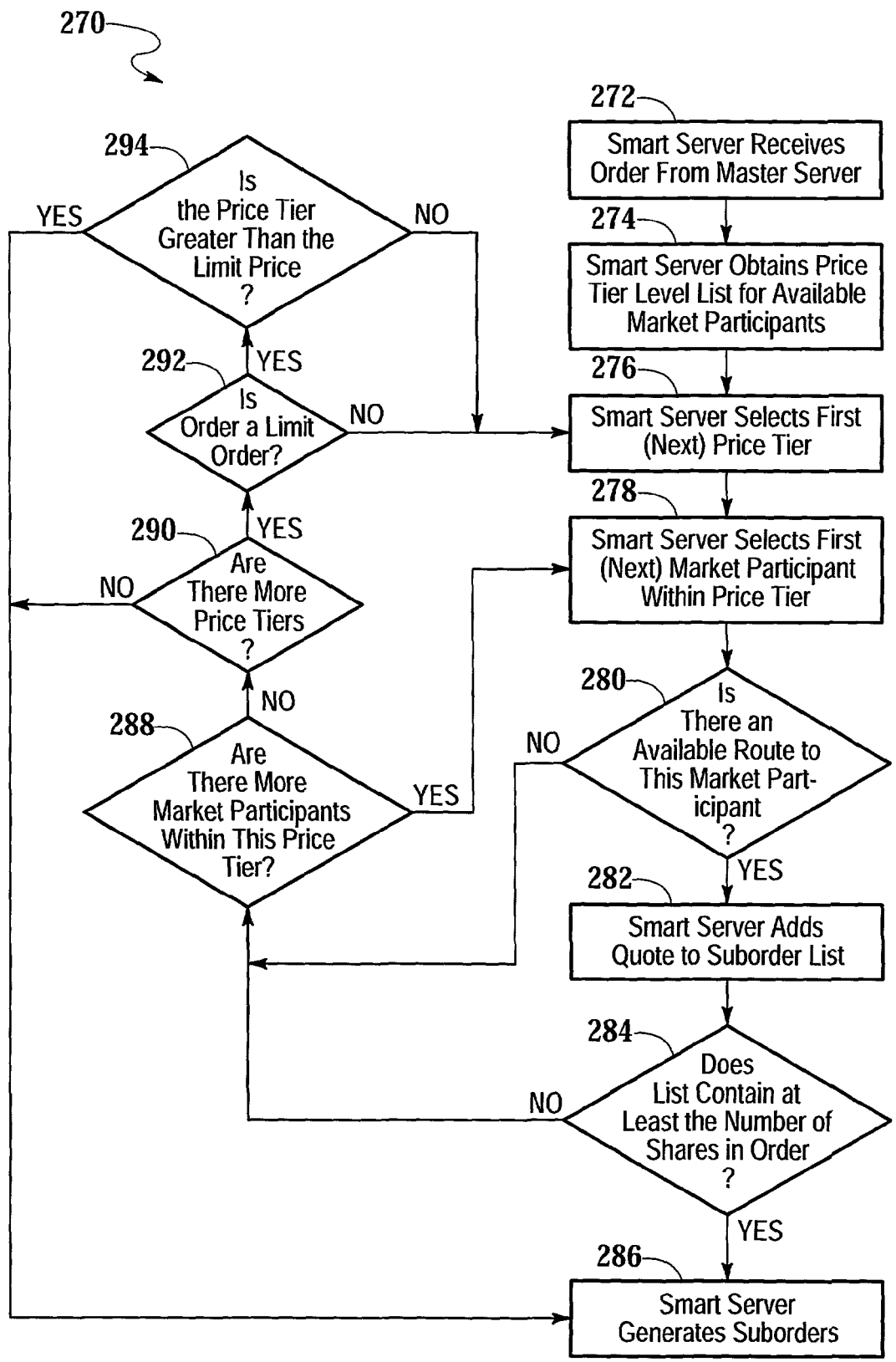
FIG. 15 is a flow diagram of a method for generating suborders using the method for obtaining the best fill for an order using automated suborders of the present invention.

Referring now to FIG. 15, therein is depicted a flow diagram of the process for creating a quote list by the smart server that is generally designated 270. Process 270 begins when the smart server receives the order from the master server in step 272. The smart server then obtains a price tier list for available market participants in step 274. The smart server obtains this list by requesting the price and share availability data associated with the security specified in the order. Next, beginning with step 276, the smart server sorts the available market participants by price tier to create the suborder quote list. Note that the ranking of suborders within a given price tier will be described below with reference to FIG. 16. First, the smart server selects the first or inside price tier in step 276. Then, in step 278, the smart server selects the first market participant within the inside price tier. Next, the smart server determines whether there is an available route to this market participant in the decision 280. If there is an available route to this market participant then the smart server adds this quote to the suborder quote list in step 282. Next, the smart server determines whether the suborder quote list contains at least the number of shares of the entire order in decision 284. If the list contains at least the number of shares in the order then the smart server generates the suborders in step 286.

If the list in decision 284 does not contain at least the number of shares in the order, then it must be determined whether there are more market participants within the inside price tier in decision 288. If there are more market participants within this inside price tier, then the smart server selects the next market participant within the inside price tier in step 278 with the flow following step 278 being the same as that described above. If there are not more market participants within this inside price tier, then it must be determined whether there are more price tiers in decision 290. If there are more price tiers, then it must be determined whether the order was a limit order in decision 292. If the order is not a limit order, then the smart server may select the next price tier in step 276. The flow following step 276 will be the same as described above.

Alternatively, if the order is a limit order as determined in decision 292, then it must be determined whether the new price tier exceeds the limit price in decision 294, i.e., the new price tier being higher than the limit price when buying shares and lower than the limit price when selling shares. If the new price tier does not exceed the limit price, then the smart server may select the next price tier in step 276. If, however, the new price tier does exceed the limit price, then the smart server generates the appropriate suborders in step 286. Likewise, if there were no more price tiers as determined in decision 290, then the smart server would also generate the appropriate suborders in step 286. As should be apparent in those skilled in the art, so long as there are available market participants with available shares, process 270 will create a suborder quote list and generate suborders such that all the shares of the order are accounted for within the plurality of suborders.

Figure 16:
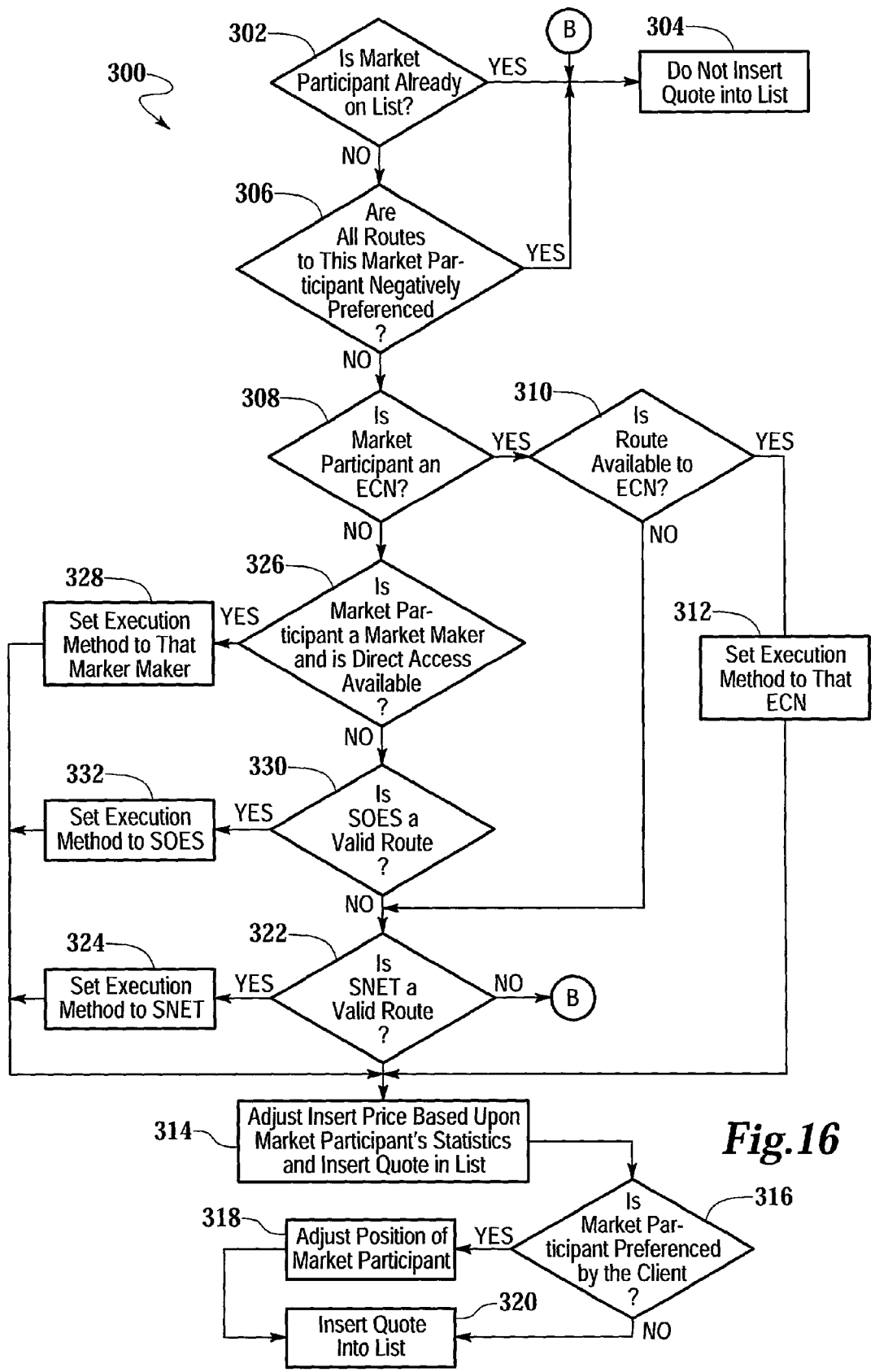
FIG. 16 is a flow diagram of a method for creating a suborder quote list using the method for obtaining the best fill for an order using automated suborders of the present invention.

Referring now to FIG. 16, therein is depicted a more detailed flow diagram of the process for creating and ranking market participants within the suborder quote list to determine, for example, the priority of suborders at the same price tier within the suborder quote list. Process 300 begins at decision 302 where it is determined whether a particular market participant is already on the list at a particular price tier. If the market participant is already on the list, the market participant is not added to the list again in step 304. If the market participant is not on the list, it is determined whether all routes to this market participant are negatively preferred by the user of client system 14 in decision 306. If the user of a client system 14 has negatively preferred all routes to this market participant, then this market participant is not added to the suborder quote list in step 304. If there is no negative preference associated with this market participant, then it must be determined how to sort various market participants within a price tier. In the illustrated embodiment, sorting is initially determined based upon the market participant type.

Specifically, in decision 308, it is determined whether the market participant is an ECN. If the market participant is an ECN, then it determined in decision 310 whether there is an available direct route to that ECN. If there is an available direct route to that ECN, then the execution method for that quote is set to that ECN in step 312. Once the quote is inserted into the suborder quote list, the price for this quote may be adjusted based upon statistics developed for that particular market participant. For example, if that particular market participant generally fills orders slower than other market participants, then a price penalty may be added to that quote to adjust that quote's position within the suborder quote list. Specifically, if the order is to buy a particular number of shares of a particular security then the price penalty may be the addition $0.01 to the price of shares of that security for the determination of sorting within the suborder quote list. This price penalty allows server system 12 to send orders preferentially to market participants that meet predetermined characteristics. Any number of factors may be used to determine whether price penalties for a particular quote are appropriate including, the fill ratio of a particular market participant, the percentage of orders rejected by a particular market participant, the likelihood of a complete fill at a particular market participant and the like.

Once the automated adjustment of insert price occurs in step 314, it must be determined whether the user of the client system 14 has preferenced certain market participants in decision 316. If the user has preferenced certain market participants, then the position of that market participant within the suborder quote list is adjusted in step 318. If on the other hand, the user has not preferenced a particular market participant, then no additional adjustment is necessary within the suborder quote list and the quote is inserted into the quote list in step 320.

Returning to decision 310, if there is no available direct route to that ECN, then it must be determined whether SelectNet is a valid route to that ECN in decision 322. If SelectNet is not a valid route, then the quote is not inserted into the suborder quote list in step 304. If, however, SelectNet is a valid route to that ECN, then the execution method for that quote may be set to SelectNet in step 324. Again, once the execution method is selected, the insert price may be adjusted in step 314 based upon the statistical model associated with executions at that particular market participant.

Returning to decision 308, if the market participant is not an ECN, then it must be determined whether the market participant is a market maker and whether there is direct access available to that market maker in decision 326. If there is direct access to that market maker, then the execution method for that quote may be set to that market maker in step 328. The insert price of that quote may be adjusted as described above with reference to step 314. If on the other hand, there is not direct access available to that market maker as determined in decision 326, then it must be determined whether SOES is a valid route to that market maker in decision 328. If SOES is a valid route then the execution method is set to SOES in step 332. Alternatively, if SOES is not a valid route then it must be determined whether Select Net is a valid route as determined in decision 322 described above.

As each of the market participants are added to the suborder quote list, they are sorted against one another within each price tier. As explained above, certain factors will create a price penalty for certain market participants relative to other market participants which will allow suborders to be sorted ahead of one another within a price tier. In addition, as should be apparent to those skilled in the art, the user of client system 14 has the ability to preference certain market participants over others and to negatively preference certain market participants or certain market participant types such that the smart server will not send suborders to negatively preferenced market participants or market participant types or will preferentially send suborders to particular market participants or market participant types based upon user preference.

Figure 17:
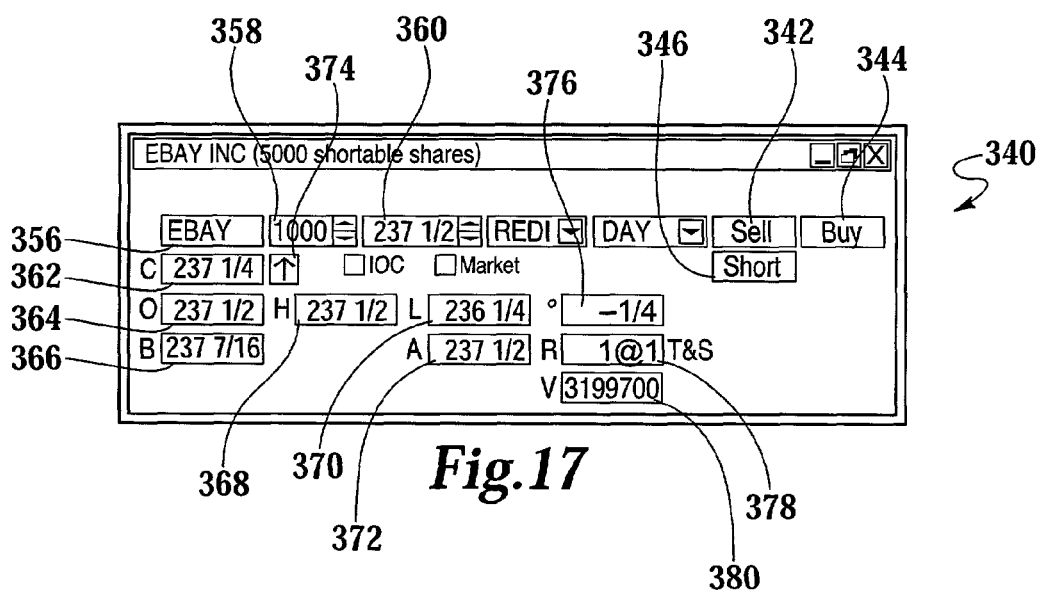
FIG. 17 is a graphical user interface depicting an environment providing a single click operation of initiating an order using the method of obtaining the best fill for an order using automated suborders of the present invention.

Referring now to FIG. 17, therein is depicted a user interface for initiating a trade using the system for obtaining the best fill for an order using automated suborders that is generally designated 340. User interface 340 provides information to the user of client system 14 about a security of interest and allows the user of client system 14 to initiate the execution of trade using a single click. User interface 340 includes a sell button 342, a buy button 344, a short button 346 each of which may have a drop down menu associated therewith having user options. User interface 340 also includes security symbol field 356, number of shares field 358, price field 360. In addition to these buttons and fields, user interface 340 includes level I data fields such as, a close field 362 that displays the price at yesterday's close, an open field 364 that displays the price at today's open, a current bid price field 366, a high for the day field 368, a low for the day field 370, a current ask price field 372, a tick direction field 374, a change on the day field 376, a ratio field 378 that displays the ratio of market participants at the inside bid vs. the inside ask and a volume field 380.

Unlike user interface 202 as seen in FIG. 11, user interface 340 does not include level II data or time & sales data. While having level II information assists the user of client system 14 in making decisions regarding the execution of a trade in the selected security, use of the system for obtaining the best fill for an order using automated suborders alleviates some of the need for level II data as the automated creation of suborders takes advantage of the level II information even if the level II information is not presented to the user of client system 14. As explained above, the present system identifies market participants with available shares to either buy or sell and sorts these market participants based upon price tier as well as other parameters. As such, regardless of whether the user of client system 14 has level II data available, the best fill is nonetheless obtained using the system obtaining the best fill for an order using automated suborders.

In fact, user interface 340 makes the initiation of trades that utilize the present system as simple as one click. In the illustrated embodiment, when the user of client system 14 wants to execution a trade which will trigger the automated suborders, the user simply clicks on buy button 344 or sell button 342. Specifically, if the user of client system 14 wants to sell 1000 shares of EBAY, the user simply clicks on sell button 344. In this case, as explained above, the system of the present invention will parse this order as necessary to obtain the best price for all 1000 shares. Likewise, if the user of client system 14 wants to buy 800 shares of EBAY, the user simply clicks on buy button 342. In this case, as explained above, the system of the present invention will parse this order as necessary to obtain the best price for all 800 shares.

While this invention has been described with a reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A method of electronically obtaining the best price for an order comprising the steps of:

electronically receiving a message identifying eligible market participant types, a security, and a number of shares of the security to include in the order;

electronically determining an available quantity of shares and a price of the available shares of the security-at each of a plurality of market participants to create a list of available shares of the security, the market participants comprising public and private electronic communication networks, market makers, exchanges, and broker systems, and the list of available shares of the security comprising the available quantity and the price of the security at each of the plurality of market participants;

electronically sorting the list of available shares of the security based at least partly on price and quantity, wherein the sorted list includes only eligible market participant types;

electronically parsing the sorted list, by a smart server in a server system, into a plurality of suborders based on the availability and price of the security at each of the plurality of market participants;

electronically identifying a subset of the market participants, based at least partly on the number of shares of the security identified in the received message, the determined available quantity of shares of the security at one or more of the plurality of market participants, and the determined price of the available shares of the security at one or more of the plurality of market participants; and electronically and automatically sending at the same time, by the server system, each of the suborders to a respective one of the subset of the plurality of market participants, the one of the subset of the plurality of market participants selected for each suborder having the best available price such that if all of the suborders are filled, the best price is obtained for the order, wherein the step of electronically sending each of the suborders to a respective one of the subset of market participants further comprises the step of electronically sending some of the suborders at a first price and some of the suborders at a second price, and wherein the operations of electronically determining, sorting, parsing, and sending are repeated until the order is fulfilled or canceled.

2. The method as recited in claim 1 wherein the step of electronically sorting the list of available shares of the security further comprises electronically sorting the list of available shares of the security based upon a preference for a respective market participant type.

3. The method as recited in claim 1 wherein the step of electronically sorting the list of available shares of the security further comprises electronically sorting the list of available shares of the security based upon direct and indirect access to the market participants.

4. The method as recited in claim 1 wherein the step of electronically sorting the list of available shares of the security further comprises electronically sorting the list of available shares of the security based upon response time of the market participants.

5. The method as recited in claim 4 wherein market participants with a lower response time are selected over market participants with a higher response time.

6. The method as recited in claim 1 further comprising the step of electronically setting an order timer for filling all of the suborders and electronically canceling any of the suborders not filled by the expiration of the order timer.

7. The method as recited in claim 1 wherein the order is a limit order and wherein the step of electronically sending each of a respective one of the subset of suborders further comprises the step of electronically sending at least one suborder at a price that is better than the limit price.

8. The method as recited in claim 1 wherein the step of electronically sorting the list of available shares of the security further comprises electronically sorting the list of available shares of the security based upon user preference of their respective market participant.

9. The method as recited in claim 1 wherein the step of electronically sorting the list of available shares of the security further comprises sorting the list of available shares of the security based the number of shares available from a market participant.

10. A method comprising the steps of:

electronically receiving a message identifying eligible market participant types, a security, and a number of shares of the security to include in the order;

electronically determining an available quantity of shares and a price of the available shares of the security-at each of the plurality of market participants to create a list of available shares of the security, the market participants comprising public and private electronic communication networks, market makers, exchanges, and broker systems, and the list of available shares of the security comprising the available quantity and the price of the security at each of the plurality of market participants;

electronically sorting the list of available shares of the security based at least partly on historical fill ratios of the market participants;

electronically parsing the sorted list, by a smart server in a server system, into a plurality of suborders based on the availability and price of the security at each of the plurality of market participants;

electronically identifying a subset of the market participants, based at least partly on the number of shares of the security identified in the received message, the determined available quantity of shares of the security at one or more of the plurality of market participants, and the determined price of the available shares of the security at one or more of the plurality of market participants; and electronically and automatically sending at the same time, by the server system, each of the suborders to a respective one of the subset of the plurality of market participants, the one of the subset of the plurality of market participants selected for each suborder having the best available price such that if all of the suborders are filled, the best price is obtained for the order;

wherein the step of electronically sending each of the suborders to a respective one of the subset further comprises the step of electronically sending some of the suborders at a first price and some of the suborders at a second price.

11. A method of electronically obtaining the best price for an order comprising the steps of:

electronically receiving a message identifying eligible market participant types, a security, and a number of shares of the security to include in the order;

electronically determining an available quantity of shares and a price of the available shares of the security at each of a plurality of market participants to create a list of a available shares of the security, the market participants comprising public and private electronic communication networks, market makers, exchanges, and broker systems, and the list of available shares of the security comprising the available quantity and price of the security at each of a plurality of market participants;

electronically sorting the list of available shares of the security based at least partly on price and quantity, wherein the sorted list includes only eligible market participant types;

electronically parsing the sorted list, by a smart server in a server system, into a plurality of suborders based on the availability and price of the security at each of the plurality of market participants;

electronically identifying a subset of the market participants, based at least partly on the number of shares of the security identified in the received message, the determined available quantity of shares of the security at one or more of the plurality of market participants, and the determined price of the available shares of the security at one or more of the plurality of market participants; and electronically and automatically sending at the same time, by the server system, each of the suborders to a respective one of the subset of the plurality of market participants, the one of the subset of the plurality of market participants selected for each suborder having the best available price such that if all of the suborders are filled, the best price is obtained for the order, wherein the step of electronically sending each of the suborders to a respective one of the subset further comprises the step of electronically sending all of the suborders at the same price, and wherein the operations of electronically determining, sorting, parsing, and sending are repeated until the order is fulfilled or canceled.

12. A method of electronically obtaining the best price for an order comprising the steps of:

electronically receiving a message identifying eligible market participant types, a security, and a number of shares of the security to include in the order;

performing a single click to initiate the order;

electronically determining an available quantity of shares and a price of the available shares of the security at each of a plurality of market participants to create a list of available shares of the security, the market participants comprising public and private electronic communication networks, market makers, exchanges, and broker systems, and the list of available shares of the security comprising the available quantity and price of the security at each of a plurality of market participants;

electronically sorting the list of available shares of the security, wherein the sorted list includes only eligible market participant types;

electronically parsing the sorted list, by a smart server in a server system, into a plurality of suborders based at least partly on the availability and price of the security at each of the plurality of market participants;

electronically identifying a subset of the market participants, based at least partly on the number of shares of the security identified in the received message, the determined available quantity of shares of the security at one or more of the plurality of market participants, and the determined price of the available shares of the security at one or more of the plurality of market participants;

electronically and automatically sending at the same time, by the server system, each of the suborders to a respective one of the subset of the plurality of market participants, the one of the subset of the plurality of market participants selected for each suborder having the best available price such that if all of the suborders are filled, the best price is obtained for the order; and electronically setting a suborder timer for filling each of the suborders, wherein the operations of electronically determining, sorting, parsing, and sending are repeated until the order is fulfilled or canceled.

13. The method as recited in claim 12 further comprising the step of electronically canceling respective suborders when a respective suborder timer expires.

14. A system for sending a plurality of suborders to fill an order comprising:

a first data processing system proving a user interface for selecting a security, a number of shares of the security to be included in the order, eligible market participant types, and initiating the order; and a second data processing system in communication with the first data processing system, the second data processing system receiving the order, querying for an available quantity of shares and a price of the available shares of the security at each of a plurality of market participants to create a list of available shares of the security, the market participants comprising public and private electronic communication networks, market makers, exchanges, and broker systems, and the list of available shares of the security comprising the available quantity and price of the security at each of a plurality of market participants, sorting the list of available shares of the security by price and quantity, wherein the sorted list includes only eligible market participant types; parsing the sorted list into a plurality of suborders based at least partly on the availability and price of the security at each of the plurality of market participants, identifying a subset of the market participants, based at least partly on the number of shares of the security identified in the received message, the determined available quantity of shares of the security at one or more of the plurality of market participants, and the determined price of the available shares of the security at one or more of the plurality of market participants, and automatically sending at the same time each of the suborders to a respective one of the subset of the plurality of market participants, the one of the subset of the plurality of market participants selected for each suborder having the best available price such that if all of the suborders are filled, the best price is obtained for the order, wherein sending each of the suborders to a respective one of the subset further comprises the step of electronically sending some of the suborders at a first price and some of the suborders at a second price and wherein the operations of electronically determining, sorting, parsing, and sending are repeated until the order is fulfilled or canceled.

15. The system as recited in claim 14 wherein the second data processing system sorts the list of available shares of the security based upon market participant type.

16. The system as recited in claim 14 wherein the second data processing system sorts the list of available shares of the security based upon user preference.

17. The system as recited in claim 14 wherein the second data processing system sorts the list of available shares of the security based upon direct and indirect access to the market participants.

18. The system as recited in claim 14 wherein the second data processing system sorts the list of available shares of the security based upon response time of the market participants.

19. The system as recited in claim 14 wherein the second data processing system sorts the list of available shares of the security of market participants based upon historical fill ratios of the market participants.

20. The system as recited in claim 19 wherein market participants with a higher historical fill ratio of past orders are selected over market participants with a lower historical fill ratio.

21. The system as recited in claim 14 wherein the second data processing system sends all of the suborders at the same price.

22. The system as recited in claim 14 wherein the second data processing system sends some of the suborders at a first price and some of the suborders at a second price.

23. The system as recited in claim 14 wherein the second data processing system sets a suborder timer for filling each of the suborders.

24. The system as recited in claim 23 wherein the second data processing system cancels respective suborders when the suborder timers expire.

25. The system as recited in claim 24 wherein the second data processing system resends the canceled suborders to another of the subset.

26. The system as recited in claim 14 wherein the order is a limit order and wherein the second data processing system sends at least one suborder at a price that is better than the limit price.

27. A non-transitory computer program embodied on a computer readable medium for sending a plurality of suborders to fill an order comprising: a code segment for receiving order parameters including a security, eligible market participant types, and a number of shares of the security to be included in the order; a code segment for querying for availability and price an available quantity of shares and a price of the available shares of the security at each of a plurality of market participants to create a list of available shares of the security, the market participants comprising public and private electronic communication networks, market makers, exchanges, and broker systems, and the list of available shares of the security comprising the available quantity and price of the security at each of a plurality of market participants; a code segment for sorting the list of available shares of the security based at least partly on price and quantity, wherein the sorted list includes only eligible market participant types; a code segment for parsing the sorted list into a plurality of suborders automatically based at least partly on the availability and price of the security at each of the plurality of market participants; a code segment for identifying a subset of the market participants, based at least partly on the number of shares of the security identified in the received message, the determined available quantity of shares of the security at one or more of the plurality of market participants, and the determined price of the available shares of the security at one or more of the plurality of market participants; and a code segment for automatically sending at the same time each of the suborders to a respective one of the subset of the plurality of market participants, the one of the subset of the plurality of market participants selected for each suborder having the best available price such that if all of the suborders are filled, the best price is obtained for the order, wherein electronically sending each of the suborders to a respective one of the subset further comprises the step of electronically sending some of the suborders at a first price and some of the suborders at a second price.

28. The non-transitory computer program as recited in claim 27 wherein the code segment for sorting the list of available shares of the security further comprises a code segment for sorting the list of available shares of the security based upon price.

29. The non-transitory computer program as recited in claim 27 wherein the code segment for sorting the list of available shares of the security further comprises a code segment for sorting the list of available shares of the security based upon market participant type.

30. The non-transitory computer program as recited in claim 27 wherein the code segment for sorting the list of available shares of the security further comprises a code segment for sorting the list of available shares of the security based upon user preference.

31. The non-transitory computer program as recited in claim 27 wherein the code segment for sorting the list of available shares of the security further comprises a code segment for sorting the list of available shares of the security based upon direct and indirect access to the market participants.

32. The non-transitory computer program as recited in claim 27 wherein the code segment for sorting the list of available shares of the security further comprises a code segment for sorting the list of available shares of the security based upon response time of the market participants.

33. The non-transitory computer program as recited in claim 27 wherein the code segment for sorting the list of available shares of the security further comprises a code segment for sorting the list of available shares of the security based upon historical fill ratios of the market participants.

34. The non-transitory computer program as recited in claim 27 wherein the code segment for sending each of the suborders to a respective one of the subset further comprises a code segment for sending all of the suborders at the same price.

35. The non-transitory computer program as recited in claim 27 wherein the code segment for sending each of the suborders to a respective one of the subset further comprises a code segment for sending some of the suborders at a first price and some of the suborders at a second price.

36. The non-transitory computer program as recited in claim 27 further comprising a code segment for setting a suborder timer for filling each of the suborders.

37. The computer program as recited in claim 36 further comprising a code segment for canceling respective suborders when the suborder timers expire.

38. The non-transitory computer program as recited in claim 27 further comprising a code segment for setting an order timer for filling all of the suborders and a code segment for canceling any of the suborders not filled by the expiration of the order timer.

39. The non-transitory computer program as recited in claim 27 wherein the order is a limit order and wherein the code segment for sending each of the suborders to a respective one of the subset further comprises a code segment for sending at least one suborder at a price that is better than the limit price.

40. The method as recited in claim 1, wherein sorting the list of available shares of the security further comprises sorting the list of available shares of the security based upon a price tier offered by each market participant.

* * * * *